US012685263B2

(12) United States Patent
Yanke et al.

(10) Patent No.: US 12,685,263 B2
(45) Date of Patent: Jul. 21, 2026

(54) AGRICULTURAL HEADER REEL WITH ADJUSTABLE SHAPE

(71) Applicant: DEERE & COMPANY, Moline, IL (US)

(72) Inventors: Bryan R Yanke, Eldridge, IA (US); Shreyas P. Modak, Thane (IN)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 18/463,689

(22) Filed: Sep. 8, 2023

(65) Prior Publication Data

US 2024/0298576 A1    Sep. 12, 2024

Related U.S. Application Data

(60) Provisional application No. 63/489,235, filed on Mar. 9, 2023.

(51) Int. Cl.
A01D 57/04    (2006.01)

(52) U.S. Cl.
CPC .................................... A01D 57/04 (2013.01)

(58) Field of Classification Search
CPC ................................. A01D 57/04; A01D 57/03
See application file for complete search history.

(56) References Cited

U.S. PATENT DOCUMENTS

| | | | | |
|---|---|---|---|---|
| 895,147 | A | * | 8/1908 | Beal ........................ A01D 57/04 56/226 |
| 3,599,410 | A | * | 8/1971 | de Coene ............... A01D 57/04 56/221 |
| 3,664,101 | A | * | 5/1972 | Hurlburt ................. A01D 57/03 56/220 |
| 3,722,194 | A | * | 3/1973 | Halls ...................... A01D 57/03 56/226 |
| 4,008,558 | A | * | 2/1977 | Mott ...................... A01D 57/04 56/226 |
| 4,487,004 | A | * | 12/1984 | Kejr ....................... A01D 41/14 56/297 |
| 6,138,447 | A | * | 10/2000 | Stivers ................... A01D 57/02 56/14.4 |
| 6,530,202 | B1 | * | 3/2003 | Guyer .................... A01D 57/03 56/226 |
| 10,980,178 | B2 | | 4/2021 | Ricketts et al. |
| 2007/0204583 | A1 | * | 9/2007 | Coers ................... A01D 61/002 56/14.4 |
| 2008/0022647 | A1 | * | 1/2008 | Jones ..................... A01D 57/03 56/220 |

(Continued)

FOREIGN PATENT DOCUMENTS

| | | | | |
|---|---|---|---|---|
| CN | 213427095 | U | 6/2021 | |
| EP | 0280791 | A1 * | 9/1988 | ............. A01D 57/03 |

(Continued)

*Primary Examiner* — Arpad Fabian-Kovacs

(57)    ABSTRACT

An example agricultural header may include a reel section coupled to a wing of an agricultural header. The reel section may include one or more bat tube supports at one or more locations along a length of the reel section, one or more bat tubes coupled the bat tube supports, and one or more linkages. A linkage is operably coupled to one of the bat tubes. A shape of the bat tube at one or more locations therealong is altered by actuation of the linkage in response to movement of the reel section.

17 Claims, 18 Drawing Sheets

(56)          References Cited

U.S. PATENT DOCUMENTS

| | | | | |
|---|---|---|---|---|
| 2013/0160418 A1* | 6/2013 | Sauerwein | ............. | A01D 57/02 |
| | | | | 56/220 |
| 2015/0272003 A1* | 10/2015 | Honey | ................... | A01D 57/03 |
| | | | | 56/181 |
| 2016/0183465 A1* | 6/2016 | Honey | ................ | A01D 61/002 |
| | | | | 56/226 |
| 2017/0055450 A1* | 3/2017 | Jasper | ................... | A01D 57/02 |
| 2017/0055451 A1* | 3/2017 | Jasper | ................... | A01D 57/03 |
| 2021/0185876 A1* | 6/2021 | Hunt | ...................... | A01D 57/02 |

FOREIGN PATENT DOCUMENTS

| | | | | | |
|---|---|---|---|---|---|
| EP | 1297735 | A1 * | 4/2003 | ............. | A01D 57/03 |
| EP | 2422608 | A1 * | 2/2012 | ............. | A01D 57/02 |
| EP | 3662739 | A1 * | 6/2020 | ............. | A01D 57/03 |
| EP | 3562294 | B1 * | 10/2020 | ............. | A01D 57/20 |
| SU | 1419570 | A1 | 8/1988 | | |
| SU | 1450782 | A1 | 1/1989 | | |
| WO | WO-2020154644 | A1 * | 7/2020 | ........... | A01D 41/144 |
| WO | WO 2021062552 | A1 | 4/2021 | | |

* cited by examiner

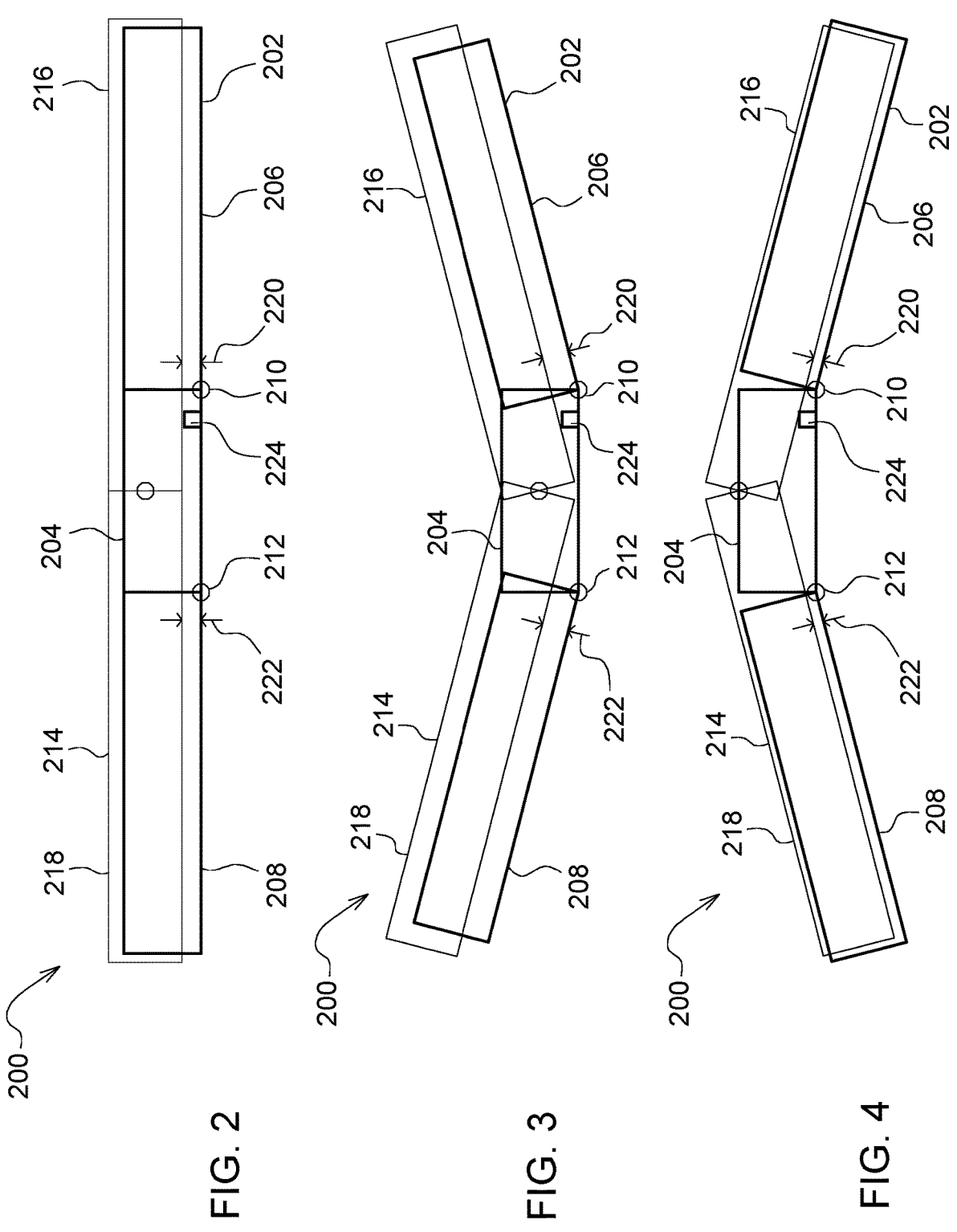

AGRICULTURAL HEADER REEL WITH ADJUSTABLE SHAPE

CROSS-REFERENCE TO RELATED APPLICATIONS

This application claims the benefit of U.S. Provisional Application No. 63/489,235, filed Mar. 9, 2023, the entire contents of which are incorporated herein by reference.

FIELD OF THE DISCLOSURE

The present disclosure relates generally to agricultural implements and, particularly, to agricultural implements that include a reel.

BACKGROUND OF THE DISCLOSURE

Agricultural harvesters use a variety of implements to gather crops. A "draper" or "draper header" is one such type of these implements. Conventional draper headers use conveyors with endless belts to carry cut crop material from leading-edge cutterbar to center regions of the headers. Draper headers generally also include a reel disposed above the conveyors that work to urge crop towards the conveyors such that the crops fall onto the conveyor once cut by the cutterbar.

SUMMARY OF THE DISCLOSURE

A first aspect of the present disclosure is directed to an agricultural header. The agricultural header may include a first section and a wing pivotably mounted to the first section. The wing may be pivotable in response to changing topography of a surface as the agricultural header is moved across the surface. The header may also include a reel rotatably mounted to the frame. The reel may include a first reel section coupled to the wing such that the first reel section pivots in response to pivoting of the wing. The first reel section may include a central shaft defining a first axis; a first bat tube support extending from the central shaft; and a bat tube coupled to a distal end of the first bat tube support. The first reel section may be rotatable about the first axis. The reel may also include a linkage that is actuatable in response to pivoting of the first reel section to alter a position of the bat tube relative to the central shaft at at least one location along a length of the bat tube.

Another aspect of the present disclosure is directed to a method of altering a position of a bat tube relative to a reel of an agricultural implement relative to a central shaft of the reel. The method may include pivoting a first header portion of an agricultural header relative to a second header portion. The agricultural header may include the first header portion; the second header portion pivotably connected relative to the first header portion; a reel; and a linkage. The reel may include a first reel section connected to the second header portion such that pivoting of the second header portion relative to the first header portion cause pivoting of the first reel section. The linkage may include a link that is coupled to the bat tube. The method may also include displacing the link of the linkage in response to pivoting of the first header portion and displacing the bat tube relative to the central shaft in response to displacement of the link.

The various aspects may include one or more of the following features. The linkage may include a first link and a first bell crank. The first link may include a first end pivotably coupled to an inboard mount and a second end opposite the first end. The first bell crank may include a first end portion, a second end of the first link pivotably attached to the first end portion of the first bell crank; and a second end portion attached to the first end portion. The second end portion may be coupled to the bat tube. The linkage may be actuatable in response to pivoting of the first reel section of the reel to move the first link and, in response, pivot the first bell crank to displace the bat tube relative to the central shaft. The first reel section may include a second bat tube support laterally offset from the first bat tube support along the first axis. The linkage may also include a second bell crank disposed adjacent to the first bat tube support and a second link extending between the first bell crank and the second bell crank. The first bell crank may be disposed adjacent to the second bat tube support. The second link may transmit movement of the first bell crank to the second bell crank. The second bell crank may include a first end portion and a second end portion coupled to the first end portion. The second end portion of the first bell crank may engage the second bat tube support. The first end portion of the second bell crank may be connected to the second link, and the second end portion of the second bell crank may engage the first bat tube support. Actuation of the linkage may pivot the first bell crank and the second bell crank to one of extend and retract the first bat tube support and the second bat tube support to displace the bat tube relative to the central shaft. The first bell crank may include a first end portion, and the first end portion may engage a portion of the first bat tube support. Actuation of the first bell crank may cause the first end portion to displace the first bat tube support relative to the central shaft. At least a portion the first bat tube support may be configured to be displaced relative to the central shaft in response to actuation of the linkage. The central shaft may include a flange. The first bat tube support may be slideably coupled to the flange, and displacement of the first bat tube support relative to the central shaft in response to actuation of the linkage may include a sliding of the first bat tube support relative to the flange to displace the first bat tube support relative to the central shaft. The first bat tube support may include one of a protrusion and a slot, and the flange may include the other of the protrusion and the slot. The protrusion may be received into and slideable within the slot. The first bat tube support may include a first bat tube support portion attached to the central shaft and a second bat tube support portion slideably coupled to the first bat tube support portion. The second bat tube support portion may be movable relative to the first bat tube support portion in response to actuation of the linkage. The first bat tube support portion and the second bat tube support portion may be slideably connected to each other. Movement of the second bat tube support portion relative to the first bat tube support portion may include movement in a direction perpendicular to the first axis. The distal end of the first bat tube support may define a second axis, and the bat tube may be configured to be rotated about the second axis to alter a distance between the bat tube and the central shaft. The second axis may extend parallel to the first axis. The first reel section may also include a bracket extending between the distal end of the bat tube support and the bat tube, and the bat tube may be configured to be rotated about the second axis by rotation of the bracket about the second axis. The linkage may include a link connected to the bracket. The link may be attached to the bracket between the distal end of the bat tube support and the bat tube.

Further, the various aspects may include one or more of the following features. Displacing the link of the linkage in response to pivoting of the first header portion may include pivoting a bell crank of the linkage. Pivoting of the bell crank may include displacing at least a portion of the bat tube support relative to the central shaft. Displacing the bat tube relative to the central shaft in response to displacement of the link may include displacing a first portion of the bat tube support relative to a second portion of the bat tube support. Displacing the bat tube relative to the central shaft in response to displacement of the link may include pivoting the bat tube about an axis defined at a distal end of the bat tube support.

Other features and aspects will become apparent by consideration of the detailed description and accompanying drawings.

BRIEF DESCRIPTION OF THE DRAWINGS

The detailed description of the drawings refers to the accompanying figures in which:

FIG. 2 is a diagrammatic front view of an example draper header with wings located in a neutral position, according to some implementations of the present disclosure.

FIG. 3 is a diagrammatic front of the draper header of FIG. 2 in a bump condition, according to some implementations of the present disclosure.

FIG. 4 is a diagrammatic front of the draper header of FIG. 2 in a droop condition, according to some implementations of the present disclosure.

DETAILED DESCRIPTION

Figure 1:
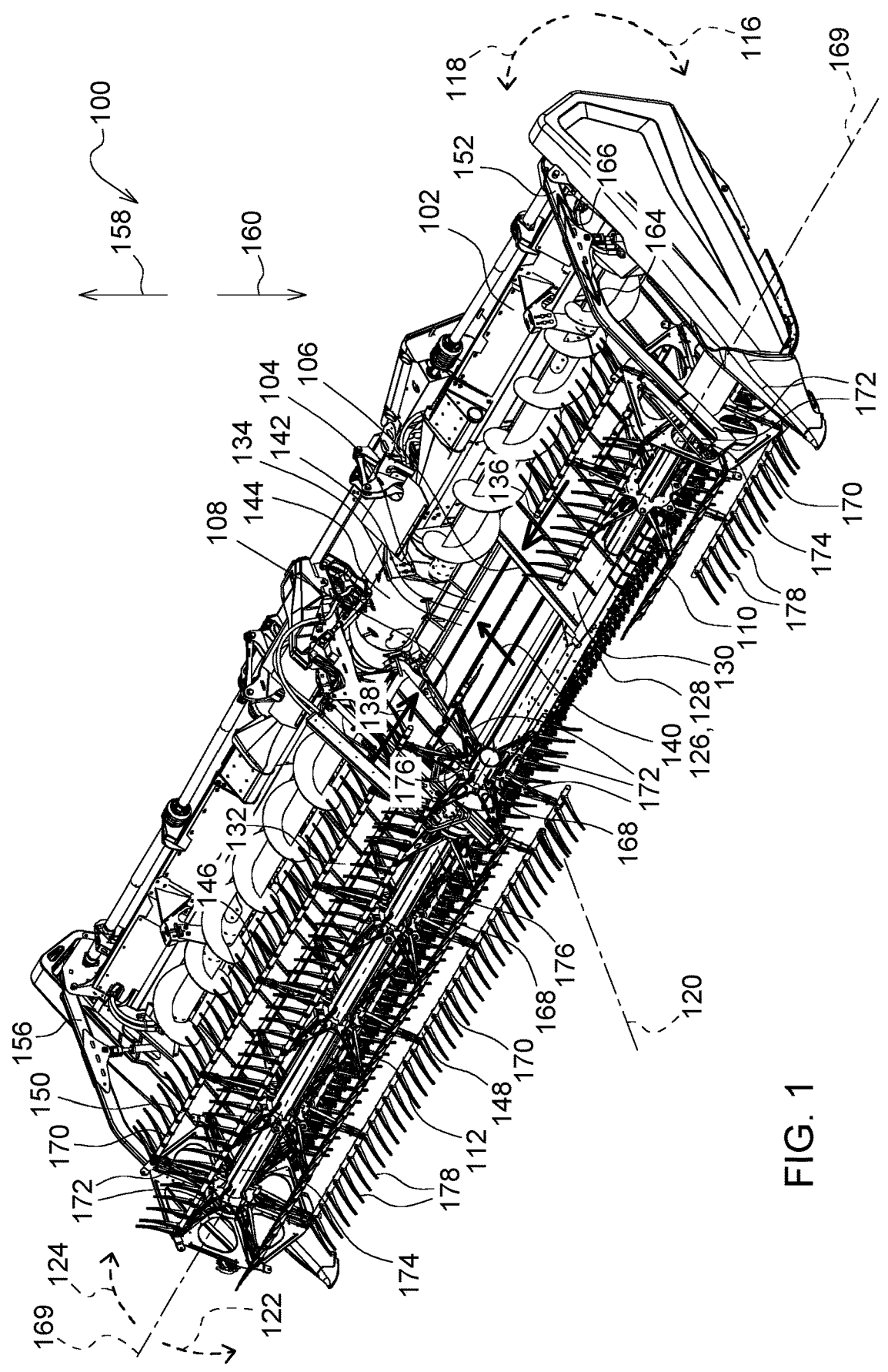
FIG. 1 is a perspective view of an example draper header, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

FIG. 1 is a perspective view of an example draper header 100. The draper header 100 includes a frame 102 that includes a center section 104 flanked on opposing sides 106 and 108 by wings 110 and 112, respectively. The wings 110 and 112 are pivotably coupled to the center section 104 such that the wing 110 is pivotable relative to the center section 104 about an axis 114 in the directions of arrows 116 and 118, and the wing 112 is pivotable relative to the center section 104 about an axis 120 in the directions of arrows 122 and 124. The draper header 100 also includes a cutterbar 126 located on a leading edge 128 of the draper header 100. In the illustrated example, the cutterbar 126 extends along an entirety of a leading edge 128. In some implementations, the cutterbar 126 may extend along less than an entirety of the leading edge 128. The cutterbar 126 operates to sever crops in the field.

The wings 110 and 112 includes conveyors 130 and 132, respectively, that are configured to convey crops severed by the cutterbar 126 to a conveyor 134 located on the center section 104. In some implementations, the conveyors 130, 132, and 134 include endless belts that move along a circuit to transport the severed crop. The conveyor 130 moves severed crop in the direction of arrow 136 towards the conveyor 134. The conveyor 132 moves severed crop in the direction of arrow 138 towards the conveyor 134. The conveyor 134 receives the severed crop from the conveyors 132 and 134 and conveys the severed crop in the direction of arrow 140. The severed crop passes through an opening 142 formed between the conveyor 134 and a roller 144. The roller 144 is rotated to advance the severed crop through the opening 142 and into a harvester, such as a combine harvester, for further processing, collection, or both.

The draper header 100 also includes a reel 146. In this example, the reel 146 includes a first section 148 and a second section 150. Although an example reel having two reel sections is described herein, the scope of the present disclosure encompasses reels having additional reel sections or fewer reel sections.

The reel section 148 is rotatably mounted on a first reel arm 152 and a second reel arm 154. The reel section 150 is rotatably mounted on the second reel arm 154 and a third reel arm 156. The first reel arm 152 is mounted to the wing 110, and the second reel arm 154 is mounted to the wing 112. Thus, when either of the wings 110, 112 pivot relative to the center section 104, such as in the course of a harvesting operation as the wings pivot in response to following a contour of the field being harvested, the respective reel arm 152 or 156 moves along with the associated wing 110 or 112, respectively. As a result of this movement of the reel arms 152 and 156, the associated reel section 148 or 150 pivots relative to the second reel arm 154. Therefore, the reel section 148 is associated with the wing 110 and pivots relative to the second reel arm 154 in response to pivoting moment of the wing 110 relative to the center section 104. Similarly, the reel section 150 is associated with the wing 112 and pivots relative to the second reel arm 154 in response to pivoting movement of the wing 112 relative to the center section 104.

In some implementations, the reel arms 152, 154, and 156 are pivotable relative to the frame 102, such as to raise or lower the reel 146 relative to the wings 110 and 112 and the center section 104. For example, the arms 152, 154, and 156 may be moveable in the direction of arrows 158 and 160 to raise and lower, respectively, the reel 146 relative to the frame 102. Still further, in some implementations, the reel 146 is movable along the arms 152, 154, and 156 in a generally forward direction (indicated by arrow 164) and moveable in a generally rearward direction (indicated by arow 166) to alter a longitudinal position of the reel 146 relative to the conveyors 130, 132, and 134. With the reel 146 adjustable in these ways, the reel 146 is movable in response to, for example, a height of crops being harvested and to encourage harvested crop fall rearwardly onto the conveyors 130, 132, and 134 to provide efficient harvesting and crop collection.

Each of the reel sections 148 and 150 include a central shaft 168 and a plurality of bat tubes 170 circumferentially arranged about and offset from the central shaft 168. The central shafts 168 define respective axes 169 about which the reel sections 148 and 150 rotate. The bat tubes 170 are coupled to bat tube supports 172 and extend from the central shaft 168. In some implementations, the bat tube supports 172 extend radially from the central shaft 168. However, other configurations of bat tube supports 172 are also within the scope of the present disclosure. The bat tube supports 172 are provided at a plurality of locations along a length of the central shaft 168, including, for example, at locations proximate to ends 174 and 176 of the central shaft 168. A plurality of reel fingers 178 is attached to each of the bat tubes 170 and operate to engage with crops that come into contact with the draper header 100 and to urge crops in a rearward direction, i.e., in a direction towards the conveyors 130, 132, and 134 as the reel 146 rotates. Although the disclosure is made in the context of draper headers, the scope of the present disclosure encompasses any agricultural implement having a reel with one or more reel sections.

FIG. 2 is a diagrammatic front view of an example draper header 200 that is similar to the draper header 100. The draper header 200 includes a frame 202 having a center portion 204 (similar to the center portion 104), a first wing 206 (similar to the wing 110), and a second wing 208 (similar to the wing 112). The first and second wings 206 and 208 are pivotably connected to the center portion 204 via a pivot connections 210 and 212. As shown in FIG. 2, the wings 206 and 208 are in a neutral position. FIG. 3 shows the draper header 200 with the wings 206 and 208 in bump relative to the center section 204, referred to as a bump condition. FIG. 4 shows the draper header 200 with the wings 206 and 208 in droop relative to the center section 204, referred to as a droop condition. The draper header 200 also includes a reel 214 that is similar to the reel 146. The reel 214 includes a first reel portion 216 and a second reel portion 218. The first reel portion 216 is connected to the first wing 206 and moves in combination with the first wing 206. For example, when the first wing 206 moves into the bump condition, such as shown in FIG. 3, the first reel portion 216 moves in concert with the first wing 206 into the bump condition. When the first wing 206 moves into the droop condition, as illustrated in FIG. 4, the first reel portion 216 moves with the first wing 206 into the droop condition. Similarly, the second reel portion 218 moves with the second wing 208, such as into the bump condition or the droop condition.

Referring to FIG. 3, the wings 206 and 208 and respective reel sections 216 and 218 are shown in the bump condition. In the bump configuration, gaps 220 and 222 formed between the reel sections 216 and 218 and the respective pivot connections 210 and 212 increases compared to a size of the gaps 220 and 222 when the wings 206 and 208 are in the neutral position. As a result of these increased gaps 220 and 222, the ability of the reel 214 to engage with and favorably manipulate the crops (e.g., urging the standing crop to a position over the respective conveyors provided on the wings 206 and 208 and center portion 204 of the draper header 200) is reduced.

Referring to FIG. 4, the wings 206 and 208 and the respective reel sections 216 and 218 are shown in the droop condition. In the droop condition, the gaps 220 and 222 formed between the reel sections 216 and 218 and the respective pivot connections 210 and 212 decreases. As a result, the risk of the reel 214, e.g., a bat tube or reel finger of the reel 214, coming into contact with some other part of the draper header 200 (e.g., a conveyor or cutterbar) increases. Such contact may result in damage to the reel 214, the other part of the draper header 200 with which the reel 214 comes into contact, or both. This damage would potentially cause a harvesting operation to be ceased in order to effect repairs of the draper header 200 before the harvesting operation could be continued. In such instances, the time and cost associated with performing the harvesting operation increases.

In order to avoid or reduce these risks, the present disclosure describes reels whose shape can be altered, for example, to enhance crop engagement with standing crop when the wings are in the bump condition or avoid the risks of contact between the reel and another part of the draper header when the wings are moved into the droop condition. A shape of a reel is alterable, for example, by altering a distance (e.g., a radial distance) between the central shaft of a reel section and a bat tube.

Figures 5, 6:
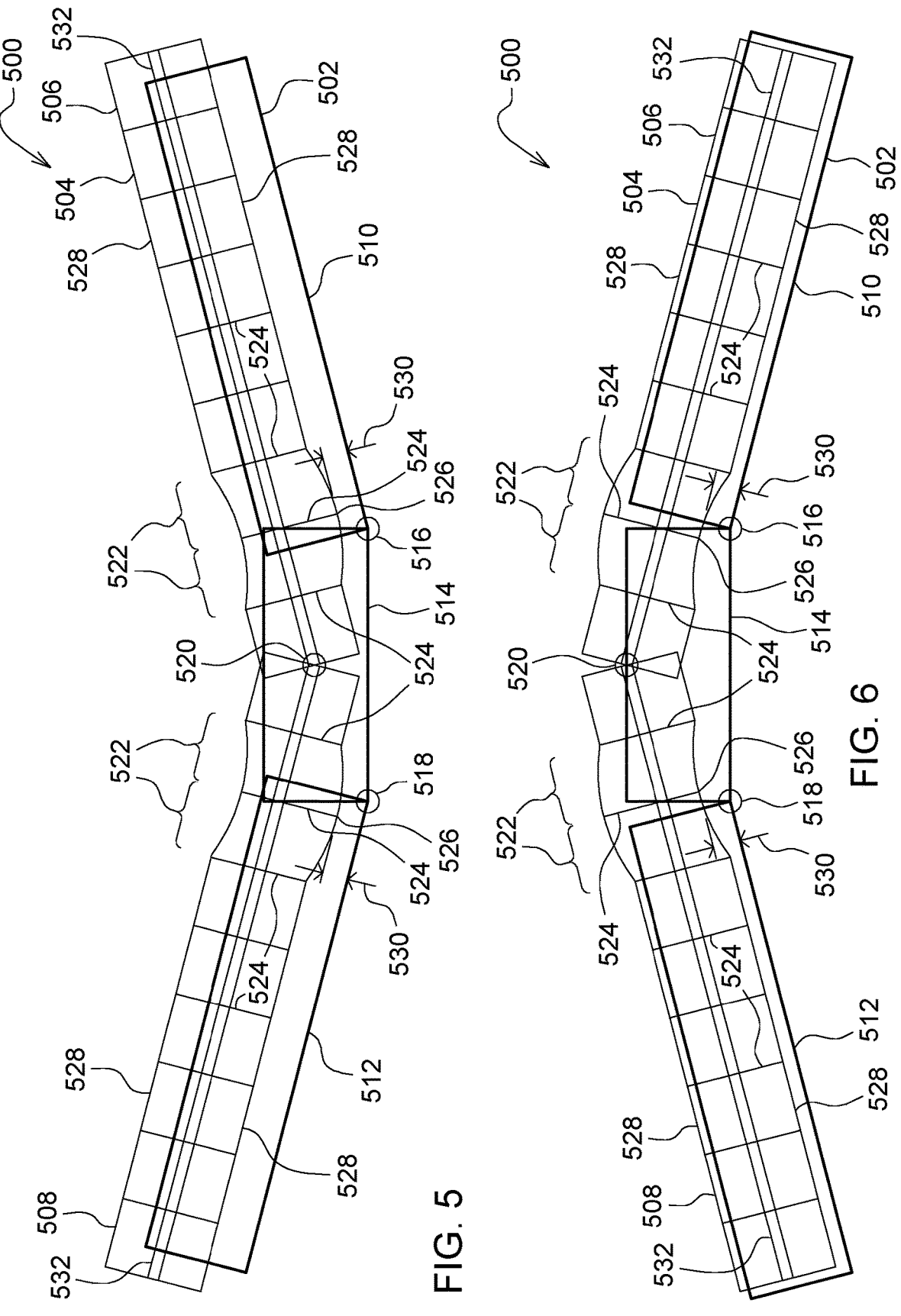
FIG. 5 is a diagrammatic front view of an example draper header in a bump condition with bat tubes thereof having an altered shape in response to the bump condition, according to some implementations of the present disclosure.
FIG. 6 is a diagrammatic front view of an example draper header in a droop condition with bat tubes thereof having an altered shape in response to the droop condition, according to some implementations of the present disclosure.

FIGS. 5 and 6 illustrate alteration of a shape of a reel in response to movement header wings in response to bump or droop. Further, although FIGS. 3 and 4 and 5 and 6 illustrate both wings being displaced in the same direction, i.e., both wings being in the bump condition or the droop condition, the scope of the present disclosure encompasses movement of one wing being in the droop condition with the other wing in the bump condition or one wing in the bump condition or the droop condition while the other wing remains in the neutral position.

FIG. 5 is a diagrammatic front view of an example draper header 500 that includes a frame 502 and a reel 504 having reel sections 506 and 508. The draper header 500 is similar to the draper header 200. As such, the frame 502 includes wings 510 and 512 that are pivotably attached to a center section 514 about respective pivot connections 516 and 518. The reel sections 506 and 508 are coupled to the wings 510 and 512, respectively, (for example, via reel arms that maybe similar to reel arms 152 and 156 described earlier) such that the reel sections 506 and 508 move with the respective wings 510 and 512. The reel sections 506 and 508 are pivotably coupled to each other at a pivot connection 520. The pivot connection 520 may be provided on a reel arm, which may be similar to reel arm 154 described above.

Each reel section 506 and 508 is divided into different segments 522 formed between adjacent sets of bat tube supports 524. In the illustrated example, each reel section 506 and 508 includes six segments 522. In other implementations, the reel sections 506 and 508 may include additional or fewer segments 522. Also in the illustrated example, a shape of the reel sections 506 and 508 (e.g., a shape of one ro more bat tubes of the reel sections 506 and 508) is alterable in response to movement of the wings 510 and 512 relative to the center section 514 (e.g., pivoting movement). For example, as shown, a shape of two of the segments 522 of each reel section 506 and 508 has a shape that is alterable to accommodate for movement of the wings 510 and 512.

As shown in FIG. 5, a shape of the reel sections 506 and 508 at two respective segments 522 at locations 526, changes based on the position of the wings 510 and 512. These changes in shape are manifested in alterations to the shape of bat tubes 528 extending between the bat tube supports 524. In the bump condition, as shown in FIG. 5, the shape of the bat tubes 528 at the respective segments 522 at the locations 526 bulge outwardly at a location adjacent to the wings 510 and 512. This bulged shape forms to reduce a size of a gap 530 formed between the reel sections 506 and 508 and the associated wing 510 and 512 at the pivot connections 516 and 518, respectively. Consequently, as a result of this bulged shape, improved engagement between fingers provided on the bat tubes 528 and standing crop results. At these segments 522 at the locations 526 opposite the pivot connection 516 and 518, the bat tubes 528 bulge inwardly towards center shafts 532 of the reel sections 506 and 508.

Although the bat tubes 528 at the segments 522 at locations 526 shown in FIG. 5 bulge outwardly away from the central shaft 532 when adjacent to the pivot connections 516 an 518 and bulge inwardly towards the central shaft 532 at an opposite side of the segments 522 when the wings 510 and 512 are in the bump condition, in other implementations, the bat tubes 528 along segments 522 configured to have an alterable shape in response to movement of the wings 510 and 512 may bulge outwardly along an entirety of the circumference of the segments 522. Consequently, in such implementations, the diameter of the reel sections 506 and 508 along these segments 522 have an increased diameter in response to the bump condition of the wings 510 and 512.

FIG. 6 shows the draper header 500 with the wings 510 and 512 in the droop condition. In this configuration, the bat tubes 528 adjacent to the pivot connections 516 and 518 at the segments 522 at locations 526 bulge inwardly towards the center shafts 532. As a result, a size of the gap 530 increase to provide improved clearance between the bat tubes 528 and associated fingers and the pivot connections 516 and 518 or other portions of the draper header 500. At these segments 522 at the locations 526 on the opposite side of the reel sections 506 and 508, the bat tubes 528 bulge outwardly away from the center shaft 532.

Although the bat tubes 528 along the segments 522 at locations 526 shown in FIG. 6 bulge inwardly towards the central shaft 532 when adjacent to the pivot connections 516 an 518 and bulge outwardly away from the central shaft 532 at an opposite side of the segments 522 when the wings 510 and 512 are in the droop condition, in other implementations, the bat tubes 528 along segments 522 configured to have an alterable shape in response to movement of the wings 510 and 512 may bulge inwardly along an entirety of the circumference of the segments 522. Consequently, in such implementations, the diameter of the reel sections 506 and 508 along these segments have a reduced diameter in response to the droop condition of the wings 510 and 512.

Figure 7:
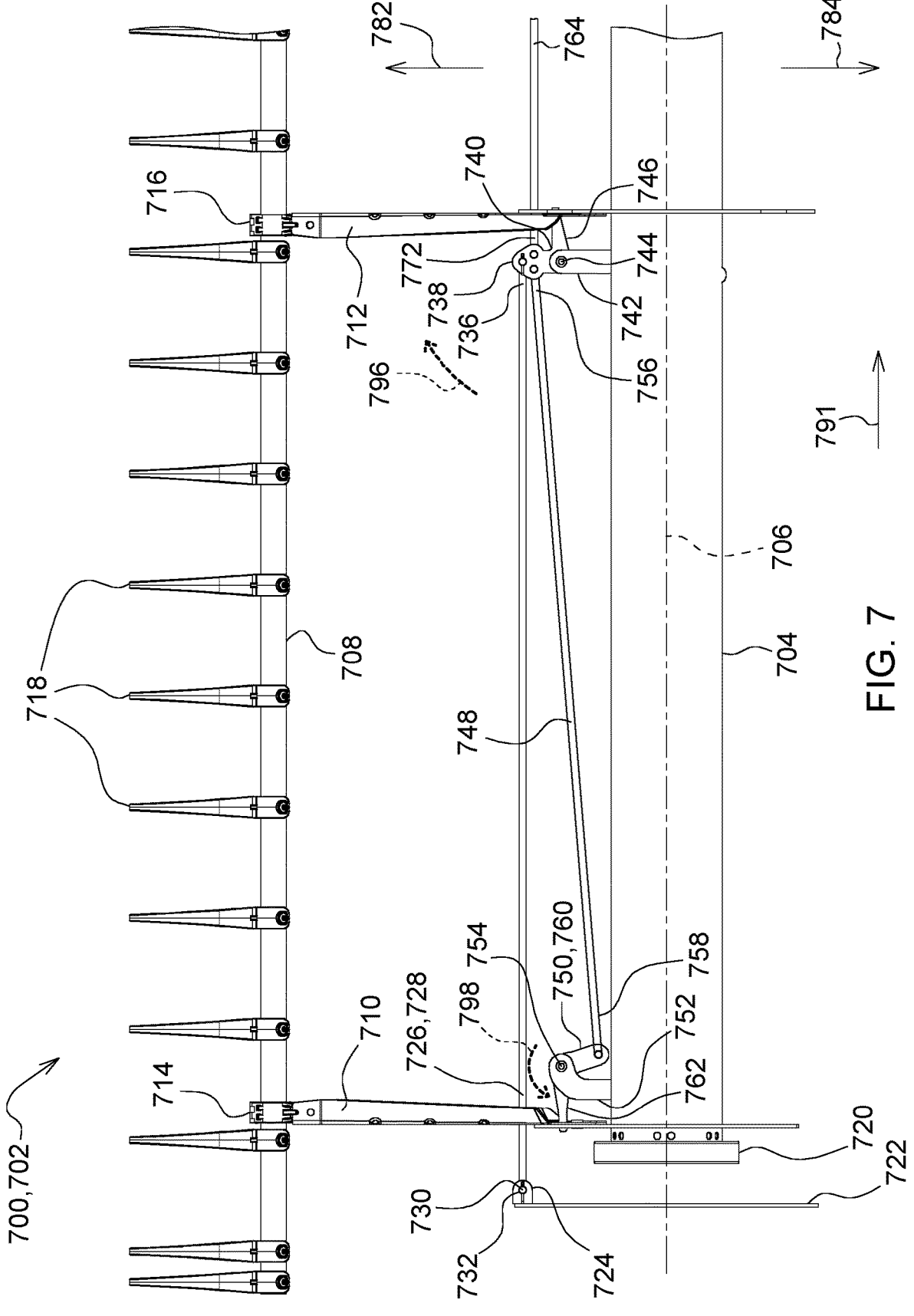
FIG. 7 a detail view of an inboard end of a reel section of an example reel, according to some implementations of the present disclosure.

FIG. 7 is a detail view of an inboard end of a reel section 700 of an example reel 702. The reel section 700 includes a center shaft 704 that defines an axis 706 about which the reel section 700 rotates. The reel section 700 also includes a plurality of bat tubes 708 disposed about a circumference of the center shaft 704. Although a single bat tube 708 is illustrated in FIG. 7, other bat tubes 708 may be included and arranged about the central shaft 704 in a manner similar to that shown in FIG. 1, for example. The reel section 700 also includes a plurality of bat tube supports 710 and 712. Although a single bat tube support 710, 712 is illustrated at each location 714 and 716, the reel section 700 may include one or more additional bat tube supports. For example, in some implementations, a plurality of bat tube supports are provided at each location and are distributed about the circumference of the center shaft 704. In some instances, the bat tube supports at adjacent locations, such as locations 714 and 716, are laterally aligned to support a bat tube, such as bat tube 708, extending along the length of the center shaft 704. In some instances, the bat tubes 708 are pivotably coupled to the bat tube supports 710, 712. The bat tube 708 includes a plurality of fingers 718 that may be similar to the fingers 178, described earlier.

The central shaft 704 includes an inboard end 720 of the reel section 700. The reel also 702 also includes an inboard mount 722 located adjacent to the inboard end 720 of the central shaft 704. In some implementations, the inboard mount 722 is a plate, such as a disc. In other implementations, the inboard mount 722 is an elongated components, such as a shaft, beam, or rod that extends from the axis 706. In some implementations, the inboard mount 722 extends perpendicularly from the axis 706. In some implementations, the inboard mount 722 is fixed relative to the reel section 700. That is, in some implementations, the inboard mount 722 does not rotate with the reel section 700. In other implementations, the inboard mount 722 rotates with the reel section 700.

Figure 8:
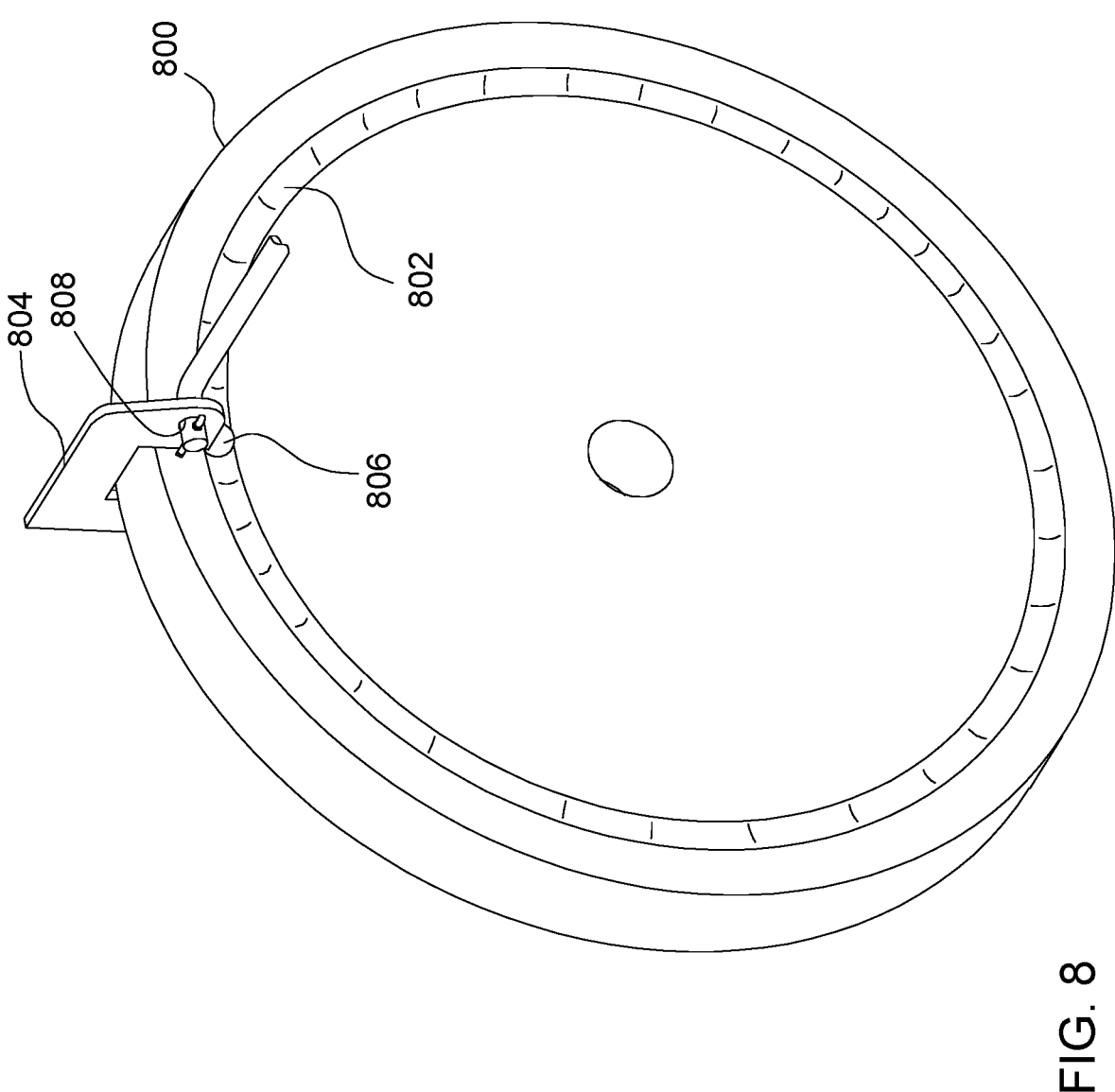
FIG. 8 is an oblique view of an example inboard mount, according to some implementations of the present disclosure.

FIG. 8 shows an example of an inboard mount 800 that may be similar to inboard mount 722. In the illustrated example, the inboard mount 800 is in the form of a disc that is stationary relative to the rotation of a reel section, such as reel section 700. In the illustrated example, the inboard mount defines an annular groove 802. In some implementations, the annular groove 802 defines a curved cross-sectional shape. In other implementations, the annular groove 802 may have a different cross-sectional shape. A follower 804 is also illustrated. A portion 806 (such as a spherical bearing) of the follower 804 is received at least partially within the annular groove 802 and slides or rolls therealong as the reel section rotates relative to the inboard mount 800. The follower 804 also includes an aperture 808 where a link pivotably attaches. Example links are described in more detail below. The follower 804 provides an example coupling that operates to transfer forces to bat tubes of the reel section as the reel section moves into a bump condition and a droop condition.

Returning to FIG. 7, the inboard mount 722 of the illustrated example rotates with the reel section 722. Consequently, a follower, such as follower 804 shown in FIG. 8 and described above, is omitted. The example inboard mount 722 is in the form of a disc. However, in other implementations, the inboard mount 722 may have another form, such as one of the forms described earlier. The inboard mount 722 includes a bracket 724. The reel section 700 also includes a linkage 726. A first rod or link 728 of the linkage 726 is pivotably coupled to the bracket 724 at a first end 730. In the illustrated example, the first end 730 of the bracket is received into an aperture 732 formed in the bracket 724, as shown in more detail in FIG. 9.

Figure 9:
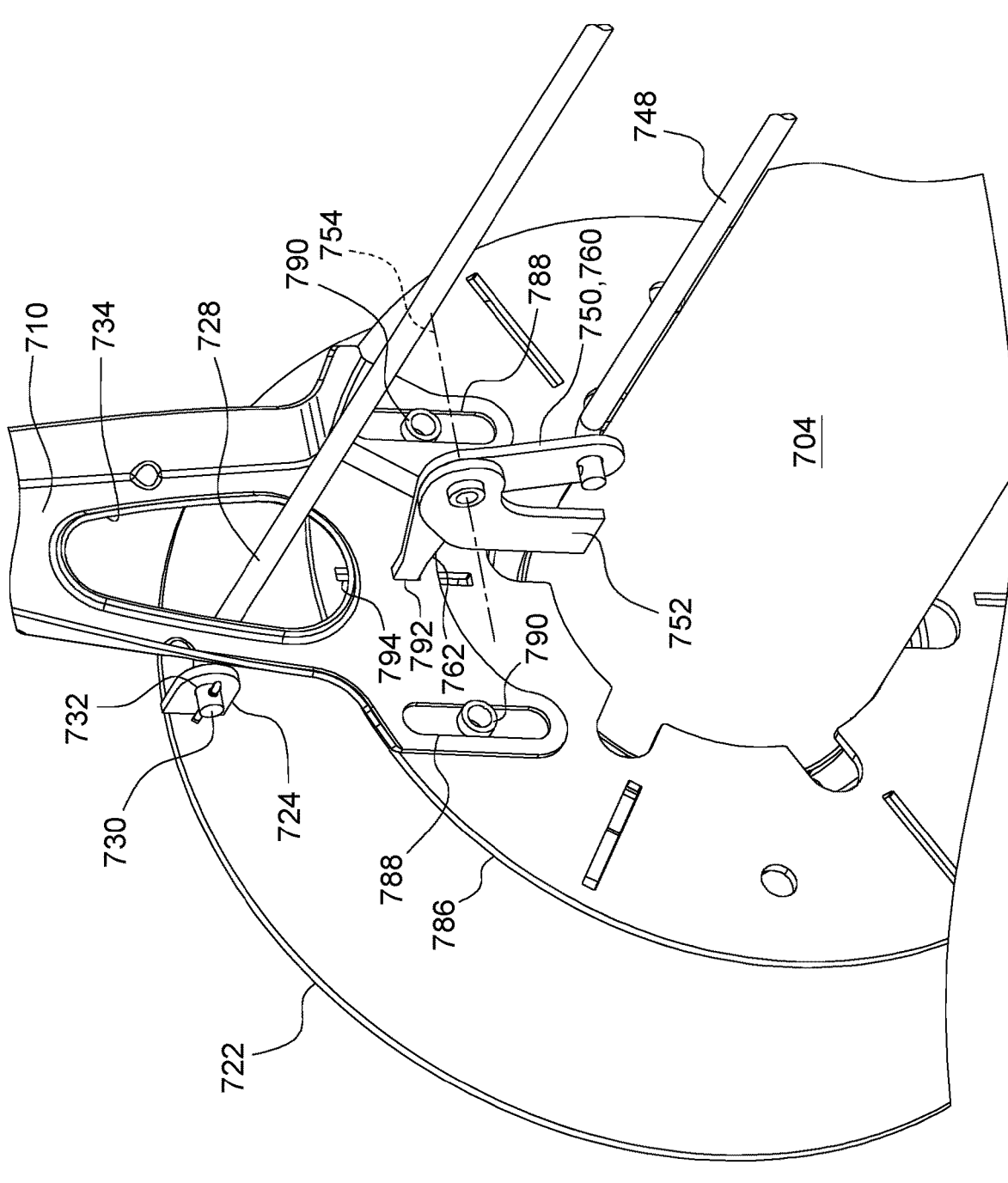
FIGS. 9 and 10 are detail views of another example reel section, according to some implementations of the present disclosure.
Figure 10:
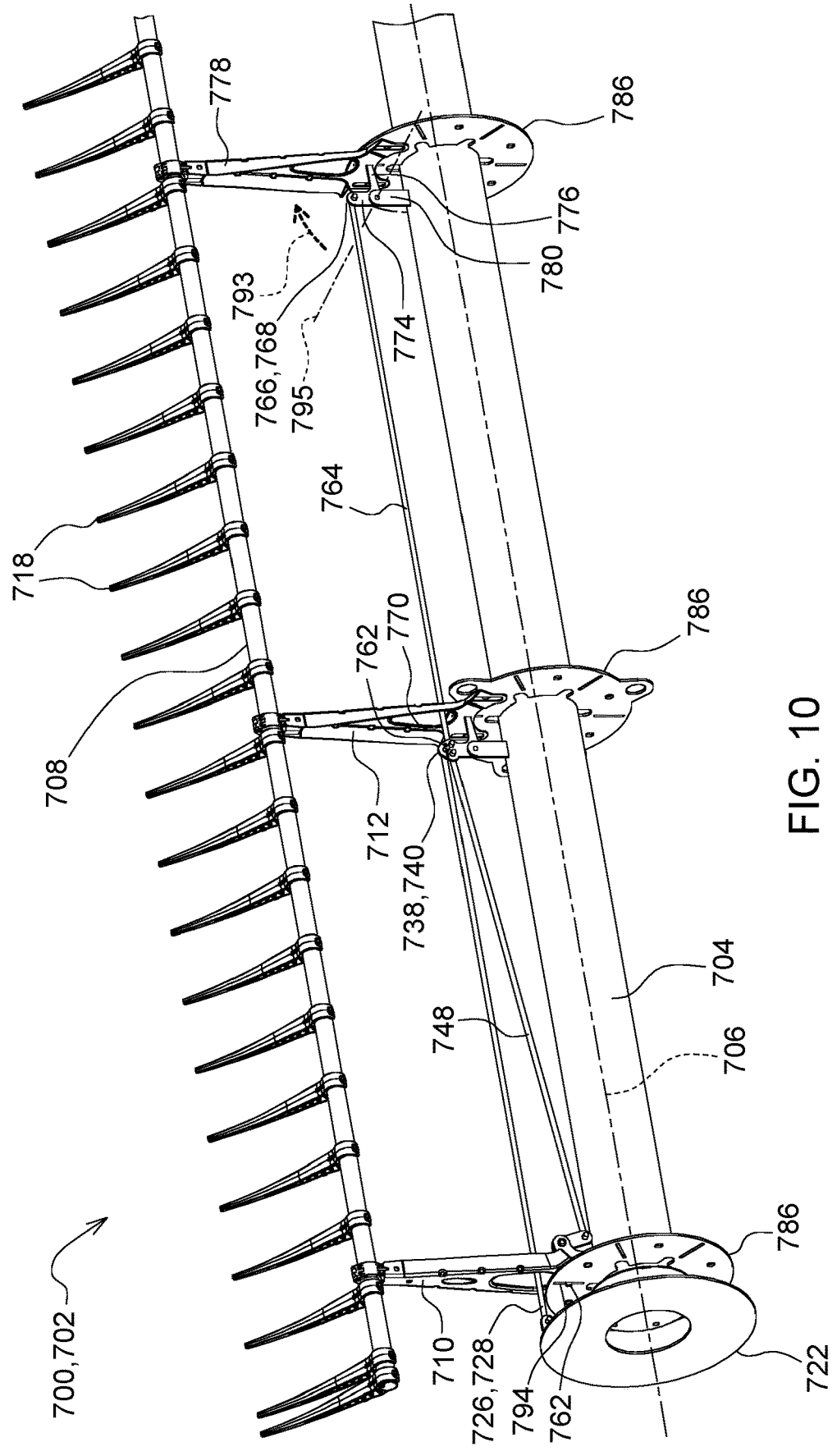

Referring to FIGS. 7, 9, and 10, the first link 728 extends laterally along the center shaft 704 and through an opening 734 formed in the first bat tube support 710. In other implementations, the first bat tube support 710 may have another shape, and, in some instances, the first link 728 may not extend through an opening formed in the first bat tube support 710. A second end 736 of the first link 728 is pivotably coupled to a first end portion 738 of a first bell crank 740 located adjacent to the second bat tube support 712. The second bat tube 712 is located adjacent to and outboard of the first bat tube support 710. The first bat tube support 710 is located at the inboard end 720 of the center shaft 704. The first bell crank 740 is pivotably connected to a bracket 742 attached to the center shaft 704. The first bell crank 740 is pivotably about an axis 744 in response to movement of the first link 728 caused by pivoting movement of the reel section 700. A second end portion 746 of the first bell crank 740 engages the second bat tube support 712.

A second link 748 extends from the first bell crank 740 to a second bell crank 750 located adjacent to the first bat tube support 710. The second bell crank 750 is pivotably mounted to a bracket 752 attached to the center shaft 704. The second bell crank 750 is pivotable about an axis 754. A first end 756 of the second link 740 is pivotably coupled the first end portion 738 of the first bell crank 740, and a second end 758 of the second link 748 is pivotably coupled to a first end portion 760 of the second bell crank 750. A second end portion 762 of the second bell crank 750 engages the first bat tube support 710.

Referring to FIG. 10, the linkage 726 may also include a third link 764 extending from the first end portion 738 of the first bell crank 740 to a first end portion 766 of a third bell crank 768. The third link 764 extends through an opening 770 formed in the second bat tube support 712. The third link 764 includes a first end 772 pivotably coupled to the first end portion 738 of the first bell crank 740 and a second end 774 pivotably coupled to the first end portion 766 of the third bell crank 768. A second end portion 776 of the third bell crank 768 engages a third bat tube support 778. Similar to the first bell crank 740 and the second bell crank 750, the third bell crank 768 is pivotably mounted to a bracket 780 attached to the center shaft 704. The third bell crank 768 is pivotably about an axis 782.

Each of the bat tube supports 710, 712, and 778 are movable relative to the center shaft 704. In the illustrated example, each of the bat tube supports 710, 712, and 778 are slideable relative to the center shaft 704 in the directions of arrows 782 and 784, as shown in FIG. 7. As shown in FIGS. 9 and 10, the bat tube supports 710, 712, and 778 are slideable coupled to respective flanges 786 formed on the center shaft 704. Although a single bat tube support being coupled to the respective flanges 786 is shown, it is understood that a plurality of bat tube supports at each location 714 and 716 may be coupled at each of the flanges 774. In the illustrated example, each of the bat tube supports 710, 712, and 778 includes slots 788 that receives a respective pin 790. In some implementations, the pins 790 may be formed on the respective flange 786. The slots 776 define the directions in which the bat tube supports 710, 712, and 778 are permitted to move relative to the center shaft 704. The bat tube supports 710, 712, and 778 also include an opening 792 (shown in FIG. 9), and the flanges 786 include a slot 794. As shown in FIG. 9, the second end portion 762 of the second bell crank 750 is received into the opening 792 and the slot 794. A similar configuration is provided with respect to bat tubes 712 and 778.

Referring to FIG. 7, during operation, as the reel section 700 moves into a bump condition such that an outboard end of the reel section 700 moves in the direction of arrow 782, the first link 728 pushes on the first bell crank 740, causing the first bell crank 740 to pivot about the axis 744 in a direction of arrow 796. As a result, the second end portion 746 of the first bell crank 740 pulls downwardly on the bat tube support 712 in the direction of arrow 784, causing the bat tube support 712 to slide towards the center shaft 704 as defined by interaction between the slots 788 and associated pins 790.

Further, rotation of the first bell crank 740 in the clockwise direction pulls on the second link 748, causing rotation of the second bell crank 750 about the axis 754 in the direction of arrow 798. As a result, the second end portion 762 of the second bell crank 750 pulls on the bat tube support 710, causing the bat tube support 710 to move towards the center shaft 704 as defined by interaction between the slots 788 and the associated pins 790. Movement of the bat tube supports 710 and 712 in this manner causes the bat tube 708 to bulge inwardly towards the center shaft 704.

Additionally, rotation of the first bell crank 740 in the direction of arrow 796 pushes the third link 764 in the direction of arrow 791, causing the third bell crank 768 to rotate in the direction of arrow 793 about axis 795. As a result, the second end portion 776 of the third bell crank 768 pulls the bat tube support 778 downwards towards the center shaft 704.

When the outboard end of the reel section 700 moves in the direction of arrow 784, placing the reel section in a droop condition, the first link 728 pulls on the first bell crank 740, causing the first bell crank 740 to pivot about the axis 744 in the direction opposite the arrow 796. As a result, the second end portion 746 of the first bell crank 740 pushes the bat tube support 712 outwardly away from the center shaft 704. Additionally, rotation of the first bell crank 730 in the direction opposite arrow 796 also pushes on the second link 748, causing the second bell crank 750 to rotate in the direction opposite of arrow 798 about the axis 754. As a result, the second end portion 762 of the second bell crank 750 pushes the bat tube support 710 outwardly away from the center shaft 704. Additionally, the first bell crank 740 pulls on the third link 764, rotating the third bell crank 768 in the direction opposite of arrow 793, causing the bat tube support 778 to be pulled towards the center shaft 704.

Movement of the bat tube supports 710, 712, and 778 in this way cause the bat tube 708 to bulge outwardly away from the center shaft 704.

For bat tube supports on an opposite side of axis 706 in the context FIG. 7, during the bump condition, the linkage similar to linkage 726 causes those bat tube supports opposite respective bat tube supports 710 and 712 to move in a manner similar to that described above in the context of a droop condition. As a result, those bat tube supports opposite bat tube supports 710 and 712 in a bump condition move outwardly away from the center shaft 704, causing the respective bat tube to bulge outwardly. As a result of this outward bulge of the bat tube, the reel section 700 reduces a size of the gap formed between reel section 700 and the respective pivot connection of a header or another portion of the header. The reel section, therefore, better engages the standing crop when the reel section 700 is moved into the bump condition.

Similarly, for those bat tube supports opposite the bat tube supports 710 and 712 on an opposite side of axis 706, in the droop condition, those bat tubes move in a manner similar to that described above in the context of the bump condition. Consequently, those bat tube supports opposite the bat tube supports 710 and 712 move inwardly towards the center shaft 704, thereby increasing a gap formed between the reel section 700 and the associated pivot connection of the header or another portion of the header. The risk of contact between the reel section 700 and a frame of the associated header is, thus, reduced.

The example of FIGS. 7 through 10 includes three bat tube supports 710, 712, and 778 laterally offset along a length of the center shaft 704. Each of these bat tubes supports 710, 712, and 778 represent a plurality of bat tube supports that extend outwardly from the respective flanges 786 and are circumferentially arranged about a circumference of the center shaft 704. The bat tube supports provided at each flange 786 may align with respective bat tubes provided at adjacent flanges 786. Each aligned set of bat tube supports may be operatively connected to a linkage similar to linkage 726 described above. Thus, in some implementations, bat tube supports distributed about the center shaft 704 are actuated continually to alter a shape of the respective bat tubes during a harvesting operation. As the reel section 700 is moved into the bump condition or droop condition, a shape of the bat tubes is altered as described herein as the reel section 700 rotates about the axis 706. In this way, the shape of the bat tubes distributed about the axis 706 are altered continually as the reel section 700 is moved from the neutral position. Further, although the illustrated example shows three locations of bat tube supports along the center shaft 704 being moveable in response to a position of the reel section 700, fewer or additional bat tubes supports at different locations along the center shaft 704 may be actuated as described to alter a shape of the bat tubes of the reel section 700.

Figure 11:
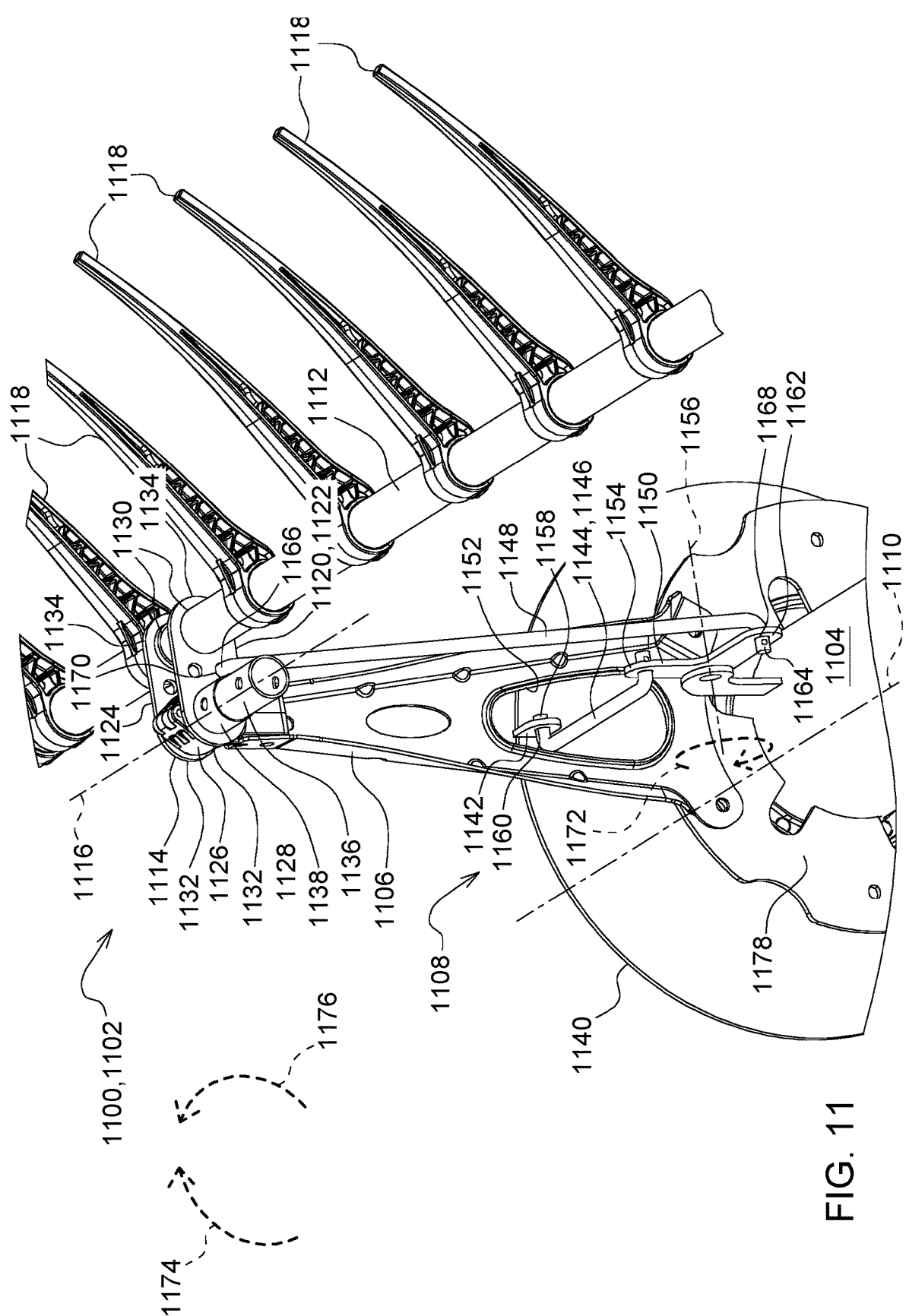
FIG. 11 is a detail view of another example reel section, according to some implementations of the present disclosure.

FIG. 11 is a detail view of another example reel section 1100 of a reel 1102 that may be similar to reel section 700 described earlier. Reel section 1100, though, varies from reel section 700 as described. The reel section 1100 includes a center shaft 1104 with bat tube supports 1106 extending outwardly from the center shaft 1102 at various locations 1108 along a length of the center shaft 1104. At each of the locations 1108, a plurality of bat tube supports 1106 extend outwardly from the center shaft 1104 about a circumference of the center shaft 1104. In some implementations, as shown in FIG. 11, for example, the bat tube supports 1106 at each location 1108 are uniformly arranged about the circumference of the center shaft 1104 and extend radially outwardly from an axis 1110 defined by the center shaft 1104. Adjacent bat tube supports 1106 at adjacent locations along the length of the center shaft 1104 are aligned.

The reel section 1100 also includes a plurality of bat tubes 1112 that extend along the center shaft 1104 and are pivotably coupled to distal ends 1114 of laterally adjacent bat tube supports 1106 such that the bat tubes 1112 are pivotable about an axis 1116 defined along the distal ends 1114 of the laterally adjacent bat tube supports 1106. A plurality of fingers 1118 are attached to the bat tubes 1112.

The bat tubes 1112 are coupled to one or more distal end 1114 of the laterally adjacent bat tube supports 1106. For example, in some implementations, a bat tube 1112 is pivotably coupled to a distal end 1114 of each bat tube support 1106 laterally arranged along the length of the center shaft 1104. The bat tubes 1106 are pivotably coupled to the distal ends 1114 with a bracket 1120. In some implementations, the bracket 1120 includes a first side 1122 and a second side 1124. The first and second sides 1122 and 1124 flank a bearing 1126 disposed at the distal end 1114 of the bat tube support 1106. An aperture 1128 and 1130 is formed at opposing ends 1132, 1134 of the first and second sides 1122 and 1124. At ends 1132, the apertures 1128 in the first and second sides 1122 and 1124 align with each other, and, at ends 1134, the apertures 1130 in the first and second sides 1122 and 1124 align with each other.

In the illustrated example, at ends 1132, the first and second sides 1122 and 1124 are received onto a shaft 1136 that extends from the bearing 1126. In some instances, the shaft 1136 is received into an opening defined by the bearing 1126. In such instances, the shaft 1126 extends from both opposing sides of the bearing 1126 and extends through the apertures 1128 formed in each side 1122 and 1124. In some instances, the sides 1122 and 1124 include a sleeve 1138 extending therefrom and are received onto the shaft 1136. In some implementations, the shaft 1136 may form part of the bearing 1126 (e.g., the shaft 1136 may be formed as an integrally part of the bearing 1126) and extend from both sides thereof to receive the respective sides 1122 and 1124.

The bat tube is received into the aligned apertures 1122 formed in the first and second sides 1114 and 1116. In some implementations, the first and second sides 1114 and 1116 of the bracket 1112 are fixed to the bat tube 1104. In other implementations, the bat tube 1104 is rotatable within bracket 1112.

Similar to the reel section 700, the reel section 1100 also includes an inboard mount 1140 having a bracket 1142. In the illustrated example, the inboard mount 1140 rotates with the reel section 1100 as the reel section 1100 rotates about axis 1110. In other implementations, the inboard mount 1140 may be similar to the inboard mount 800 and remain stationary relative to rotation of the reel section 1100 about the axis 1110.

A linkage 1144 extends between the inboard mount 1140 and the bracket 1120. The linkage 1144 includes a first link 1146, a second link 1148, and a bell crank 1150 disposed between the first and second links 1146 and 1148. The first link 1146 extends through an opening 1152 in the bat tube support 1106 and is pivotably connected to the inboard mount 1140 and to a first end portion 1154 of the bell crank 1150. The bell crank 1150 is pivotable about an axis 1156 in response to movement of the first link 1146 caused by pivoting movement of the reel section 1100, as described earlier. In the illustrated example, a first end 1158 of the first link 1146 is received into an opening 1160 formed in the bracket 1142. In other implementations, the first link 1146 can be pivotably coupled to the bracket 1142 in other ways.

The second link 1148 extends between a second end portion 1162 of the bell crank 1150 and the bracket 1124 connected to the bat tube 1112. A first end 1164 of the second link 1148 is pivotably connected to the second end portion 1162 of the bell crank 1140, and a second end 1166 of the second link 1148 is pivotably connected to the bracket 1124. In the illustrated example, the first end 1164 of the second link 1148 is received into an opening 1168 formed in the second end portion 1162 of the bell crank 1150, and the second end 1166 of the second link 1148 is received into an opening 1170 formed in one or both of the sides 1122 and 1124 of the bracket 1124.

In operation, as the reel section 1100 rotates about the axis 1110 and the reel section is pivoted in response to pivoting movement of a header wing to which the reel section 1100 is coupled (for example, as described earlier), the linkage 1144 actuates to cause a change in position of the bat tube 1112 relative to the center shaft 1104. When the reel section 1100 moves into a bump condition, the first link 1146 pushes the bell crank 1150, pushing the first end portion 1154 of the bell crank 1150 away from bat tube support 1106 and causing the bell crank 1150 to move in a direction of arrow 1172. As a result, the second link 1148 pulls the bracket 1124 towards the center shaft 1104, causing the bat tube 1112 to pivot about the axis 1116 in the direction of arrow 1174. Thus, in the bump condition, the bat tubes 1112 located at a top of the center shaft 1104, move inwardly towards the center shaft 1104. For bat tubes 1112 located on the bottom of the center shaft 1104, as would be understood when the header including the reel 1102 is conventionally oriented on the ground, the first link 1146 of the linkage 1144 pulls the rocker arm 1150 such that the first end portion 1154 of the rocker arm 1150 is drawn towards the bat tube support 1106. As a result, the second link 1148 pushes outwardly on the bracket 1124, causing the bat tube 1112 to pivot about the axis 1116 in the direction of arrow 1176. Thus, in the bump condition, the bat tubes 1112 located at the bottom of the center shaft 1104 move outwardly away from the center shaft 1104 to reduce the size of the gap described earlier formed between the reel section 1100 and another part of the header, provided for improved engagement between the reel section 1100 and standing crop.

When the reel section 1100 moves into the droop condition, the movement of the linkage 1144 at the top of the center shaft 1104 is reversed compared to the movement described above with respect to the bump condition. Thus, at the top of the center shaft 1104 when the reel section is in the droop condition, the bat tube 1112 pivots about the axis 1116 such that the bat tube 1112 move outwardly away from the center shaft 1104. Also, actuation of the linkage 1144 at the bottom of the center shaft 1104 is likewise reversed, causing the bat tube 1112 to pivot about the axis 1116 such that the bat tube 1112 moves inwardly towards the center shaft 1104, thereby increasing the size of the gap and reducing the risk of contact between the reel section 1100 and another part of the header.

Although the example of FIG. 11 is shown with a linkage 1144 used to alter a position of the bat tubes 1112 at the bat tube supports 1106 adjacent to an inboard end 1178 of the center shaft 1104, in other implementations, the linkage 1144 may be modified such that a position of the bat tube 1112 at other locations along the length of the center shaft 1104 is also changed based on a movement of the reel section 1100 away from a neutral position.

Although the example linkage 1144 in FIG. 11 is shown connected to the bat tube 1106 at a single location, i.e., at the bracket 1124 associated with the inboard bat tube support 1106, in other implementations, the linkage 1144 may include other components, e.g., one or more links, bell cranks, etc., to couple to the bat tube at other locations along a length of the center shaft 1104. An example of this type of construction is shown in FIG. 12.

Figure 12:
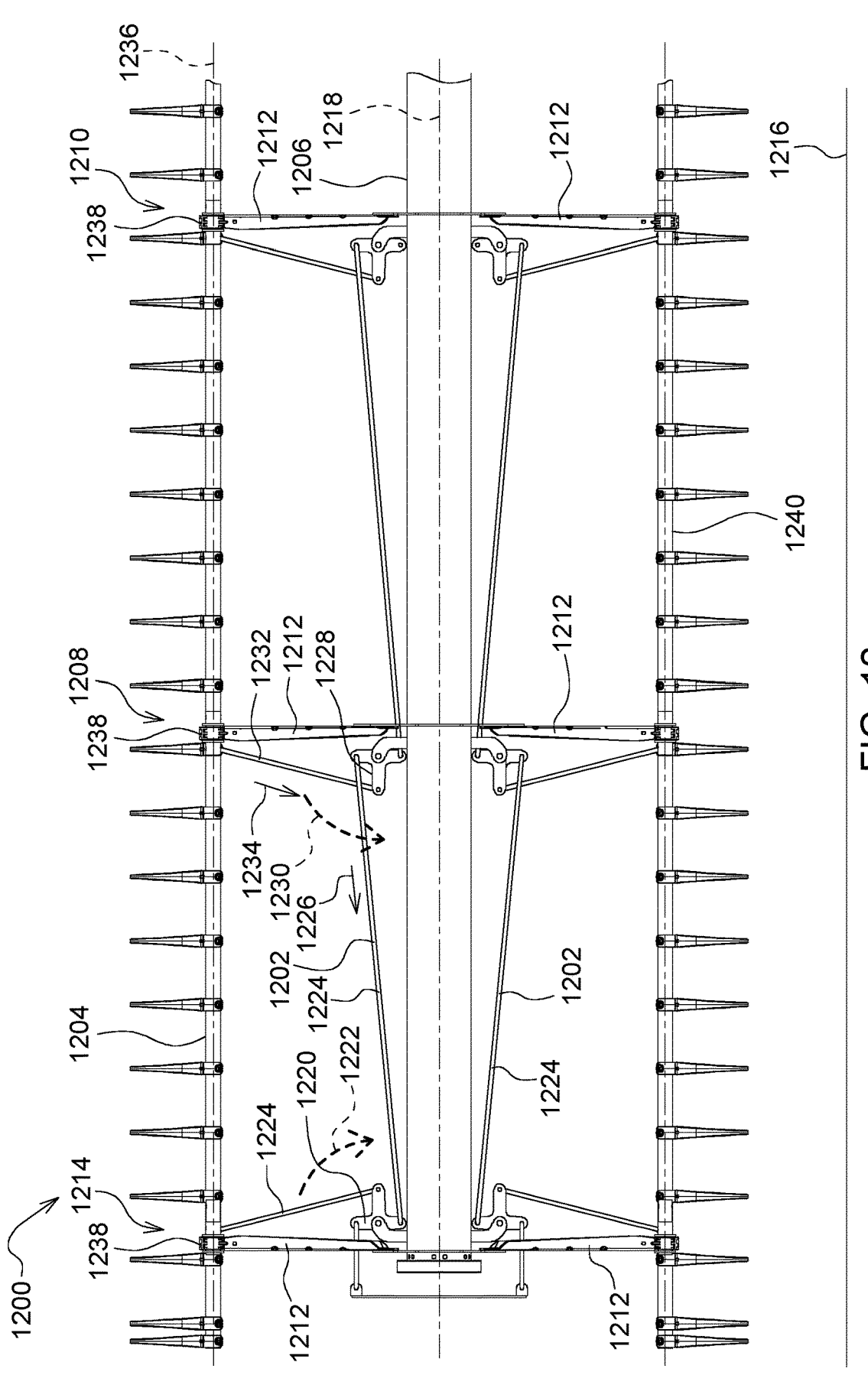
FIG. 12 is a front view of the example reel section of FIG. 11.

In FIG. 12, the reel section 1200 is similar to the reel section 1100 shown in FIG. 11. The reel section 1200 includes a linkage 1202 that is similar to the linkage 1144 the of the reel section 1100 except that of the linkage 1202 includes additional links (e.g., links 1224) and bell cranks to displace a bat tube 1204 at other locations along the length of a center shaft 1206 of the reel section 1200. As shown in FIG. 12, the linkage 1202 is operable to displace the bat tube 1204 at two additional locations 1208 and 1210 associate with two different groups of bat tube supports 1212 in addition to a first location at 1214. As illustrated, the reel section 1200 is conventionally oriented above the ground 1216. In the bump condition, for the illustrated linkage 1202 above axis 1218 about which the reel section 1200 is rotated, as presented in the context of FIG. 12, the bell crank 1220 is rotated in the direction of arrow 1222, causing the bell crank 1220 to pull the link 1224 in the direction of arrow 1226. In response, a second bell crank 1228 positioned adjacent to the second location 1208 along the center shaft 1206 is rotated in the direction of arrow 1230, thereby pulling link 1232 in the direction of arrow 1234. In response, the bat tube 1204 pivots about an axis 1236 defined by the distal ends 1238 of the bat tube supports 1212. As a result, the bat tube 1204 is moved towards the center shaft 1206. The arrangement of the linkage 1202 is similar at the third location 1210, also causing the bat tube 1204 to pivot and move towards the center shaft 1206. The linkage 1202 associated with a bat tube 1240 on the opposite side of axis 1218 defined by the center shaft 1206 operate in manner opposite to those located above the axis 1218. Consequently, in the bump condition, the linkage 1202 causes the bat tube 1240 to pivot such that the bat tube moves outwardly away from the center shaft 1206. In the droop condition, the movements of the bat tubes 1204 and 1240 are reversed.

Figure 13:
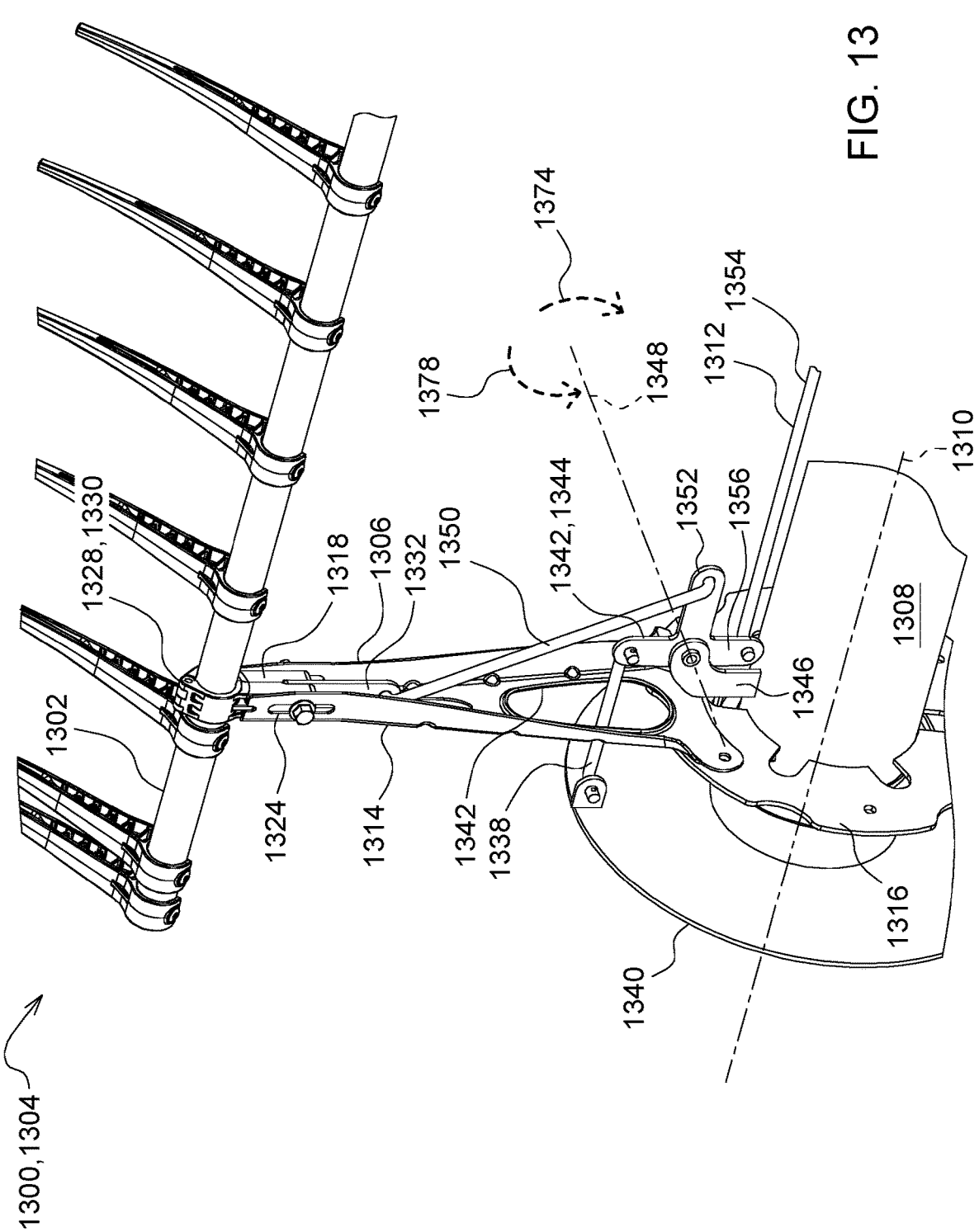
FIGS. 13 through 15 are detail views of another example reel section, according to some implementations of the present disclosure.
Figure 14:
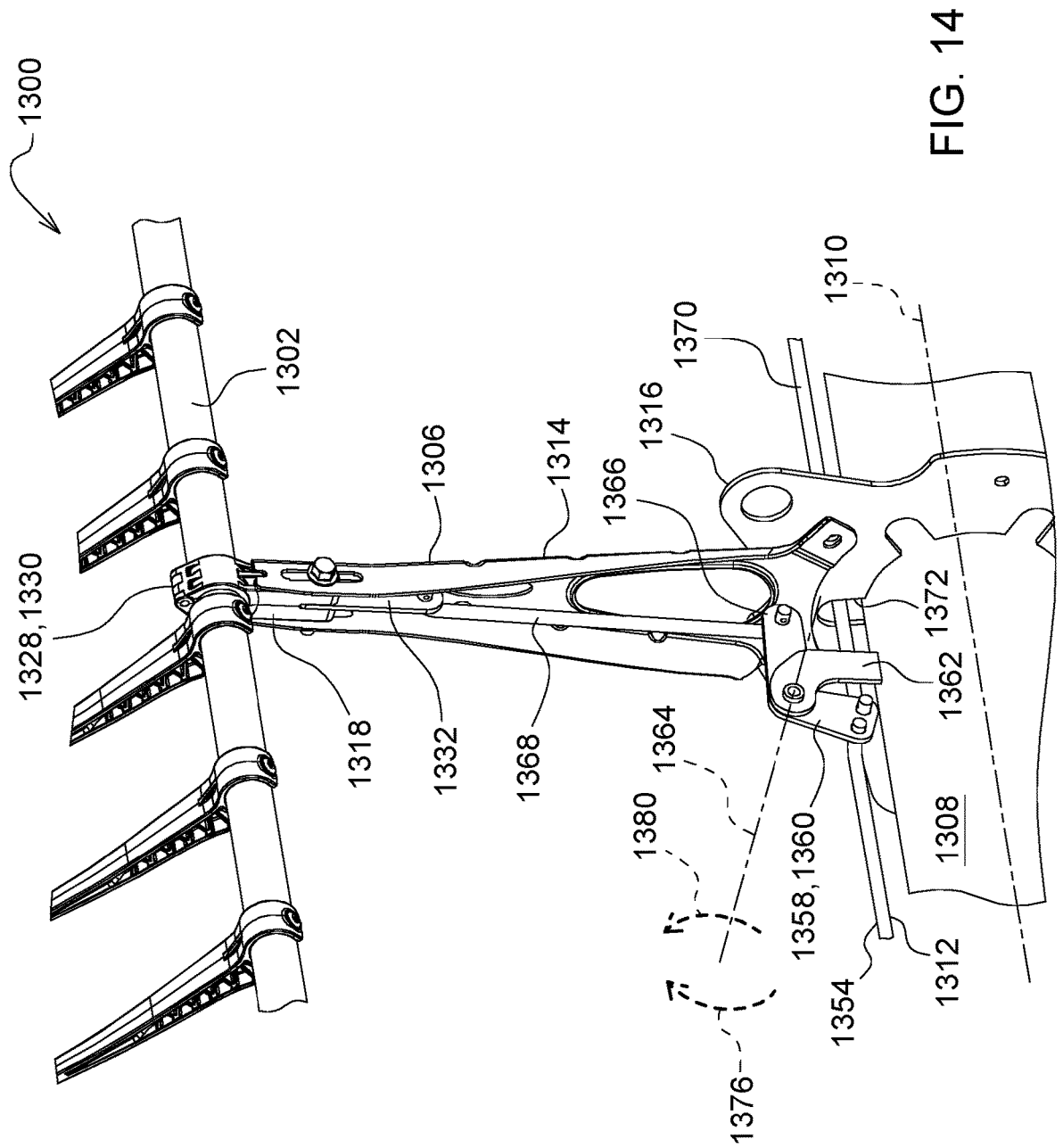
Figure 15:
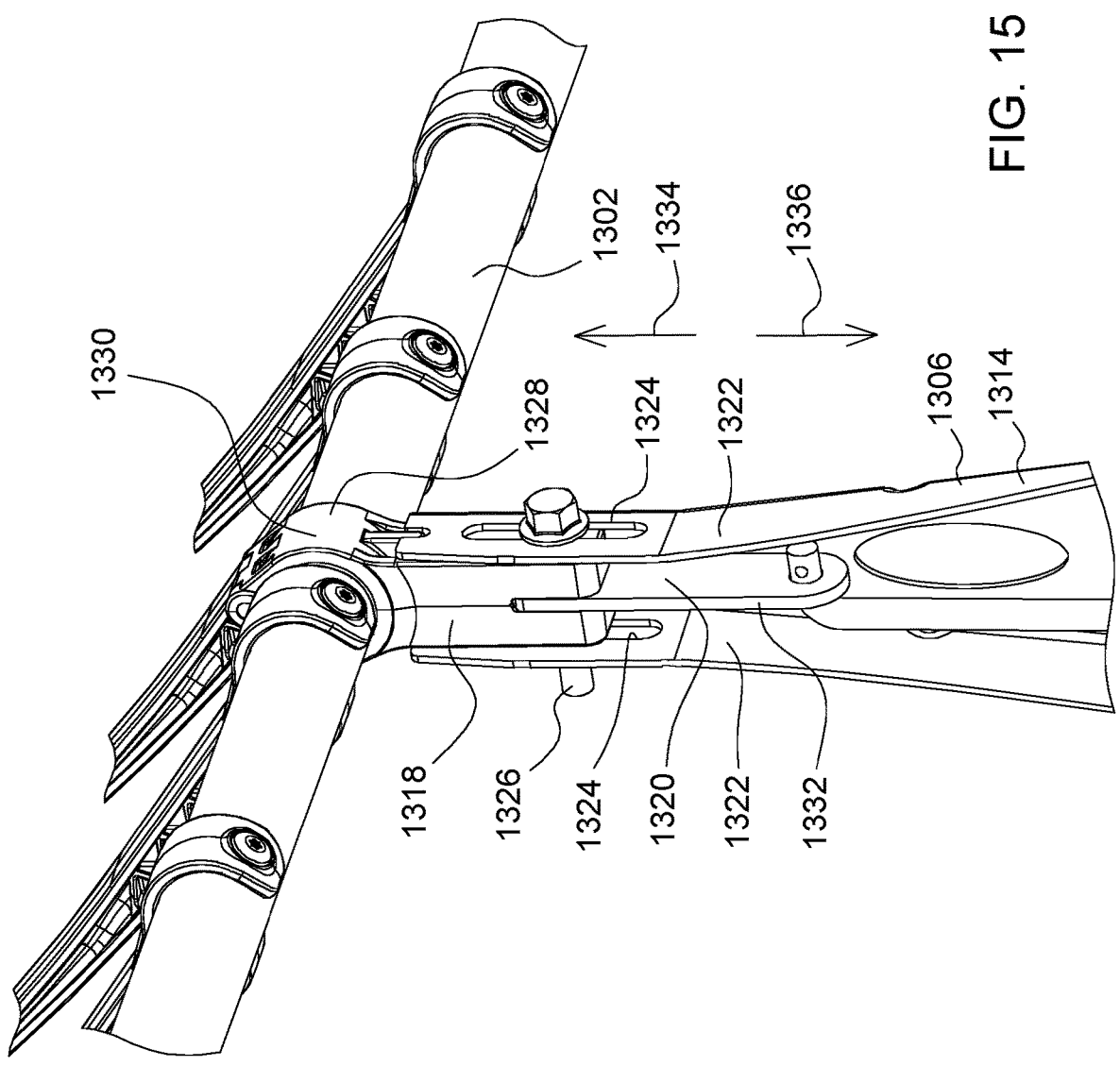

FIGS. 13, 14, and 15 are detail views of another example reel section 1300 in which a position of one or more bat tubes 1302 thereof is alterable passively in response to movement of the reel section 1300 away from a neutral position. The reel section 1300 forms part of a reel 1304 that is included on a header, which may be similar to the header 100 described above. The reel 1204 may be similar to the reel 146 described earlier. The reel section 1300 is connected to a wing of a header and is moveable in response to a pivoting movement of the wing.

FIGS. 13, 14, and 15 illustrate different bat tube supports 1306 located at different locations along a length of the reel section 1300, with those bat tube supports 1306 being aligned to support a single bat tube 1302. Although a single bat tube support 1306 is shown at each location, it is understood that a plurality of bat tube supports 1306 are provided at each location and are arranged about a circumference of a center shaft 1308 of the reel section 1300. Adjacent bat tube supports 1306 at different location along the length of the center shaft 1308 are aligned to support a bat tube 1302 extending along the length of the center shaft 1308. Thus, each group of aligned bat tube supports 1306 support a single bat tube 1302. The center shaft 1308 defines an axis 1310 about which the reel section 1300 rotates. A linkage 1312 to alter a position of a bat tube 1302 at one or more locations can be provided for each group of aligned bat tube supports 1306. Further, the linkage 1312 can be coupled to the respective bat tube 1302 at one or more of the aligned bat tube supports 1306. That is, in some instances, a linkage 1312 may be configured to alter a position (e.g., a radial position) of a bat tube 1302 at one location or a plurality of locations along the length of the bat tube 1302.

In the example of FIGS. 13, 14, and 15, the bat tube supports 1306 include a first portion 1314 attached to the center shaft 1308, such as via a flange 1316 which may be similar to the flanges 774 described above. A second portion 1318 of the bat tube support 1306 is moveable relative to the first portion 1314. In this example, the second portion 1318 is slideable relative to the first portion 1314 such that the second portion 1318 is movable both towards and away from the center shaft 1308. In some instances, the second portion 1318 is movable perpendicularly relative to the axis 1310 of the center shaft 1308. As shown in FIG. 15, the first portion 1314 of the bat tube support 1306 is received into a slot 1320 defined between sides 1322 of the first portion 1314. Aligned slots 1324 are formed in the sides 1322 and receive a pin 1326 that extends through the second portion 1318. In the illustrated example, the pin 1326 is a fastener, such as a bolt. In other implementations, the pin 1326 may have other forms. Still further, in some implementations, the pin 1326 may include two separate protrusions that extend from opposing sides of the second portion 1318 with each protrusion received into one of the slots 1324. In some implementations, one or more of the protrusions are moveable between a retracted position and an extended portion, with the protrusions being biased in the extended position. The second portion 1318 is slideable relative to the first portion 1314 in a direction defined by the slots 1324.

A first end 1328 of the second portion 1318 includes a bracket 1330 used to connect with the bat tube 1302. In some implementations, the bat tube 1302 is rotatable within the bracket 1330. In other implementations, the bat tube 1302 is fixed within the bracket 1330. A second end 1332 of the second portion 1318 connects to the linkage 1312, described below. Movement from the linkage 1312 is operable to displace the second portion 1318 within the slot 1320 formed by the first portion 1314 outwardly in a direction of arrow 1334 and inwardly in a direction of arrow 1336, opposite the direction of arrow 1334. Consequently, the second portion 1318 interacts with the first portion 1314 and linkage 1312 to alter a shape of the bat tube 1302 by displacing the bat tube 1302 away from and towards the center shaft 1308.

The linkage 1312 is coupled to the second portions 1318 of one or more aligned bat tube supports 1306 along the length of the center shaft 1308. In some implementations, a linkage 1312 is provided for each group of aligned bat tube supports 1306. In some implementations, a linkage 1312 is provided for some groups of aligned bat tube supports 1306 and not others. In some implementations, a linkage 1312 is provided for a single group of aligned bat tube supports 1306.

The example linkage 1312 includes a first link 1338 pivotably coupled to an inboard mount 1340. The inboard mount 1340 may be similar to those described above (e.g., inboard mount 714 or 800) and may be stationary relative to rotation of the reel section 1300 or may rotate with the reel section 1300. Referring to FIG. 13, the first link 1338 is pivotably connected to the inboard mount 1340 and extends through an opening 1342 formed in the first portion 1314 of the inboard-most bat tube support 1306. The first link 1338 is pivotably connected to a first end portion 1342 of a first bell crank 1344. The first bell crank 1344 is pivotably connected to a bracket 1346 attached to the center shaft 1306, and the first bell crank 1344 is pivotably about an axis 1348. In some implementations, the axis 1348 is perpendicular to the axis 1310. A second link 1350 is pivotably connected to a second end portion 1352 of the first bell crank 1344 and extends to the second end 1332 of the second portion 1318 of the bat tube support 1306. As shown, the first portion 1314 of the first bat tube support 1306 is attached to the flange 1316 formed on or otherwise attached to the center shaft 1308. A third link 1354 is pivotably attached to and extends from a third end portion 1356 of the first bell crank 1344. In the illustrated example, the first end portion 1342 and the second end portion 1356 are parallel to each other and located on opposite each other relative to the axis 1348. The second end portion 1352 extends perpendicularly from the first end portion 1342 and the third end portion 1356. However, in other implementations, the configuration of the first bell crank 1344 can be different. For example, in other implementations, an angular relationship between the first, second, and third end portions 1342, 1352, and 1356 can be different.

The third link 1354 extends to a first end portion 1358 of a second bell crank 1360 that is pivotably attached to a second bracket 1362. The second bracket 1362 is attached to the center shaft 1308, and the second bell crank 1360 is pivotable about an axis 1364. In some implementations, the axis 1364 is perpendicular to the axis 1310 extending along the center shaft 1308. A second end portion 1366 of the second bell crank 1360 is connected to a second portion 1318 of a second bat tube support 1306 via a fourth link 1368. The second bat tube support 1306 is aligned with the first bat tube support 1306 adjacent to the inboard mount 1340. The fourth link 1368 is pivotably connected to the second end portion 1336 of the second bell crank 1360. A fifth link 1370 extends through an opening 1372 formed in a flange 1316 formed on or attached to the center shaft 1308 and extends to another bell crank of the linkage 1312 to alter a position of the bat tube 1302 at another location along the length of the reel section 1300. Again, although a single linkage 1312 is illustrated and described, the reel section 1300 may include a plurality of linkages 1312 arranged about a circumference of the center shaft 1308.

In operation, in the bump condition and at a top side of the reel section 1300 (as shown in the context of FIGS. 13 and 14 and as the reel section 1300 would be conventionally oriented relative to the ground), the first link 1338 causes the first bell crank 1344 to pivot about the axis 1348 in the direction of arrow 1374. In response, the second link 1350 is pulled the center shaft 1308, causing the second portion 1318 of the bat tube support 1306 to move inwardly towards the center shaft 1308 and, consequently, displacing a portion of the bat tube 1302 at the location of the first bat tube support 1306 inwardly towards the center shaft 1308. Additionally, the third link 1354 moves towards the outboard mount 1340 in response to rotation of the first bell crank 1344 in the direction of arrow 1374. As a result, the second bell crank 1360 is rotated about axis 1364 in the direction of arrow 1376, as shown in FIG. 14. In response, the fourth link 1368 is moved towards the center shaft 1308, causing the second end portion 1318 of the second bat tube support 1306 to be displaced towards the center shaft 1308. Consequently, a portion of the bat tube 1302 at a location of the second bat tube support 1306 is displaced towards the center shaft 1308. Thus, linkages 1312 that are located at the top as the reel section 1300 rotates causes a position of the associated bat tube 1302 at one or more locations along the length thereof to be displaced inwardly towards the center shaft 1308.

The described action of the linkage 1312 at the top side of the reel section 1300 in a bump condition is identical to that at the bottom side of the reel section 1300 (as shown in the context of FIGS. 13 and 14 as the reel section would be conventionally oriented relative to the ground) in a droop condition. Thus, in the droop condition, at the bottom side of the reel section 1300, the bat tube 1302 is moved inwardly towards the center shaft 1308 and, consequently, away from a wing of a header. Thus, a size of a gap formed between the reel section 1300 and the wing is increased at one or more locations of the bat tube 1302 along the length of the reel section 1300.

At the bottom of the reel section 1300 in the bump condition, the actuation of the linkage 1312 is reversed. The first link 1338 causes the first bell crank 1344 to pivot about the axis 1348 in the direction of arrow 1378, displacing the second link 1350 outwardly away from the center shaft 1308. The outwardly displaced second link 1350 likewise displaces the bat tube 1302 at the first bat tube support 1306 outwardly away from the center shaft 1308 via outward movement of the second portion 1318 of the first bat tube support 1306 relative to the first portion 1314 of the first bat tube support 1306. The bat tube 1302 is also displaced outwardly at the second bat tube support 1306 in response to rotation of the second bell crank 1360 in the direction of arrow 1380 that displaces the fourth link 1368 and the second portion 1318 of the second bat tube support 1306 outwardly away from the center shaft 1308. Rotation of the second bell crank 1360 in the direction of arrow 1380 also displaces the fifth link 1370 in a direction away from the inboard mount 1340, causing displacement of the bat tube 1302 away from the center shaft 1308 at one or more additional locations along the reel section 1300.

The described action of the linkage 1312 at the bottom side of the reel section 1300 in the bump condition is identical to the action of linkage 1312 at the top side in the droop condition. Thus, at a top side of the reel section 1300 in the droop condition, actuation of the linkage 1312 causes the bat tube 1302 to be displaced outwardly away from the center shaft 1308 at one or more locations along the length of the reel section 1300.

Figures 16, 17, 18:
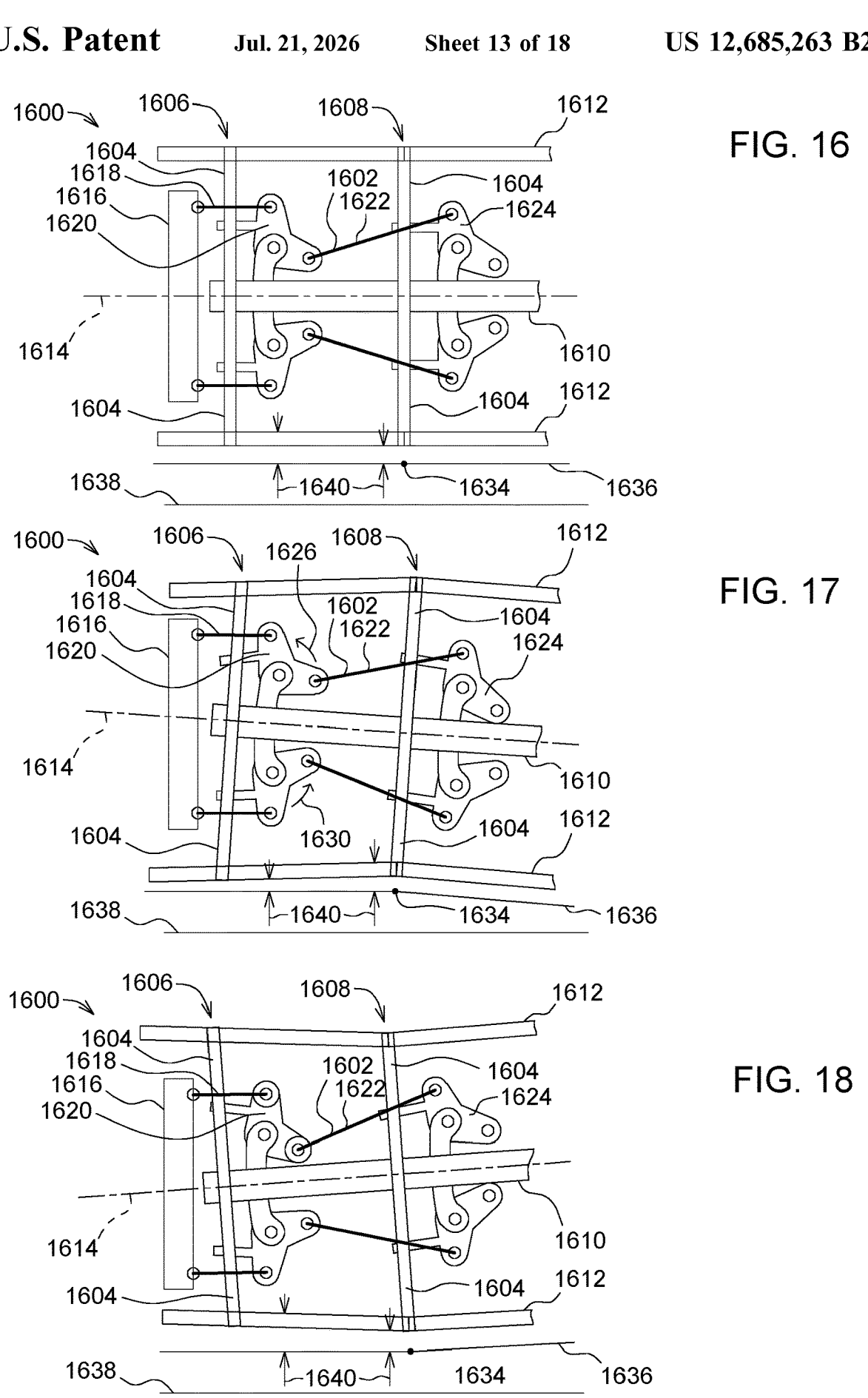
FIGS. 16 through 18 are diagrammatic views of another example reel section in which aligned bat tube supports are movable in opposing directions in response to a bump condition or a droop condition of the reel section, according to some implementations of the present disclosure.

FIGS. 16, 17, and 18 are diagrammatic views showing another example reel section 1600 having the ability to move different portions of a bat tube extending along the reel in different directions in the bump condition and the droop condition. FIG. 16 shows the reel section 1600 in a neutral position; FIG. 17 shows the reel section 1600 in the droop condition; and FIG. 18 shows the reel section 1600 in the bump condition. The reel section 1600 includes linkages 1602 that operate passively in response to a pivoting movement of the reel sections 1600 (such as in response to movement of a wing of a header of which the reel section 1600 is coupled). Similar to other reel sections described herein, the reel section 1600 includes a plurality of bat tube supports 1604 at a plurality of locations 1606 and 1608 along a length of the reel section 1600. At each location 1606 and 1608, the plurality of bat tube supports 1604 are distributed about a circumference of a center shaft 1610 of the reel section 1600, and adjacent bat tube supports 1604 at adjacent locations may be aligned. A plurality of bat tubes 1612 extend along the length of the reel section 1600 and are distributed about the circumference of the center shaft 1610. Each bat tube 1612 of the plurality of bat tubes 1612 is associated with and coupled to a group of aligned bat tube supports 1604. FIGS. 16 through 18 illustrate a single linkage 1602 coupled to two aligned bat tube supports 1604 at two different locations 1606 and 1608 along a length of the reel section 1600. However, a linkage 1602 may be provided for each aligned group of bat tube supports 1604 and may be coupled to the bat tube 1612 at one, some, or all of the aligned bat tube supports 1604. Thus, in FIGS. 16 through 18, it is understood that a second linkage on an opposite side of axis 1614 defined by the center shaft 1610 is present and operably coupled to the bat tube 1612 in a manner similar to that described below.

The reel section 1600 also include an inboard mount 1616 similar, which may be similar to the inboard mounts described above. The linkage 1602 includes a first link 1618 extending from and pivotably connected to the inboard mount 1616. The first link 1618 is pivotably connected to a first bell crank 1620 pivotably connected to the center shaft 1610. A second link 1622 is pivotably connected to extends from and the first bell crank 1620 to a second bell crank 1624. The linkage 1602 may be operably connected to the bat tube 1612 in any manner described herein, such as that shown in FIG. 9, FIG. 11, or FIG. 13.

FIG. 17 shows the reel section 1600 in a droop condition. In the droop condition, referring to the top of the center shaft 1610 in the context of the FIG. 13, the first link 1618 causes the bell crank 1620 to pivot counterclockwise in the direction of arrow 1626. In response, at location 1606, the bat tube 1612 is displaced towards the center shaft 1610, such as by moving the bat tube support 1604 at location 1606 towards the center shaft 1610 or in another fashion as described herein or otherwise within the scope of the present disclosure. At location 1608, the bat tube 1610 is move outwardly away from the center shaft 1610 as the second link 1622 pivots the second bell crank 1624 in a clockwise direction as indicated by arrow 1628. As a result, at the top of the reel section 1600, the bat tube 1612 is made to bulge inwardly at the location 1606 and outwardly at the location 1608.

On the opposite side of the axis 1614 (i.e., at the bottom of the reel section 1600 as presented in the context of FIG. 17), the first link 1618 of the linkage 1602 pushes on the first bell crank 1620, causing the first bell crank 1620 to rotate in the direction of arrow 1630. The bat tube 1612 is, consequently, moved outwardly away from the center shaft 1610. Further, the second link 1622 of the second linkage 1602 pulls on a second bell crank 1624, causing the second bell crank 1624 to rotate in the direction of arrow 1632. As a result, the bat tube 1612 at the location 1608 is moved inwardly towards the center shaft 1610. Thus, the example linkages 1602 are operable to alter a position of the bat tubes 1612 in different directions at different locations 1606 and 1608 along the length of the reel section 1600.

It is noted that a pivot connection 1634 of a wing 1636 coupled to the reel section 1600 is shown adjacent to the bat tube supports 1604 at location 1608. The wing 1636 is shown positioned adjacent to the ground 1638. Therefore, in the droop condition, a gap 1640 formed between the bat tube 1612 at location 1608 and the pivot connection 1634 is increased by movement of the bat tube 1612 at location 1608 towards the center shaft 1610 to reduce the risk of contact between the reel section 1600 and the pivot location 1634, cutterbar, or other part of the header. Similarly, movement of the bat tube 1612 at location 1606 away from the center shaft 1610 reduces the size of the gap 1640 to improve engagement between the standing crop and the reel section 1600.

In the bump condition, the linkages 1602 on the opposing sides of the axis 1614 operate in the opposite way as described above. Consequently, in the bump condition, at the top of the center shaft 1610 (as understood in the context of FIGS. 16, 17, and 18), the bat tube 1612 at the location 1606 is move outwardly away from the center shaft 1610, and, at the bottom of the reel 1600, the bat tube 1612 at the same location 1606 is moved inwardly. At location 1608 at the top of the reel section 1600, the bat tube 1612 is moved inwardly towards the center shaft 1610, and, at the bottom of the reel section 1600, the bat tube 1612 is move outwardly away from the center shaft 1610. Along the bottom of the reel section 1600, the size of the gap 1640 is increased at the location 1606, and, at the location 1608, the size of the gap 1640 is decreased near the pivot connection 1634.

In the illustrated example of FIGS. 16 through 18, a position of the bat tubes 1612 is altered by engagement of the bell cranks 1620 and 1624 with the respective bat tube supports 1604 in a manner similar to that shown in FIGS. 7 and 9. However, the linkages 1602 may be configured in other ways to alter a position of a bat tube at one or more locations, including the examples shown in FIG. 11 and FIGS. 13-15.

For the described example, as the reel section 1600 rotates about the axis 1614 as the reel section moves into either the droop condition or bump condition, at locations 1606 and 1608, a position of the bat tubes 1612 is alternated between one of an outwardly displaced position and an inwardly displaced position. Further, as explained, the example reel section 1600 includes the capability to move each bat tube 1612 at different locations 1606 and 1608 therealong in different directions in response to movement of the reel section 1600 into the bump condition or the droop condition to alter a size of the gap 1640 at different locations along the length of the reel section 1600.

Figure 19:
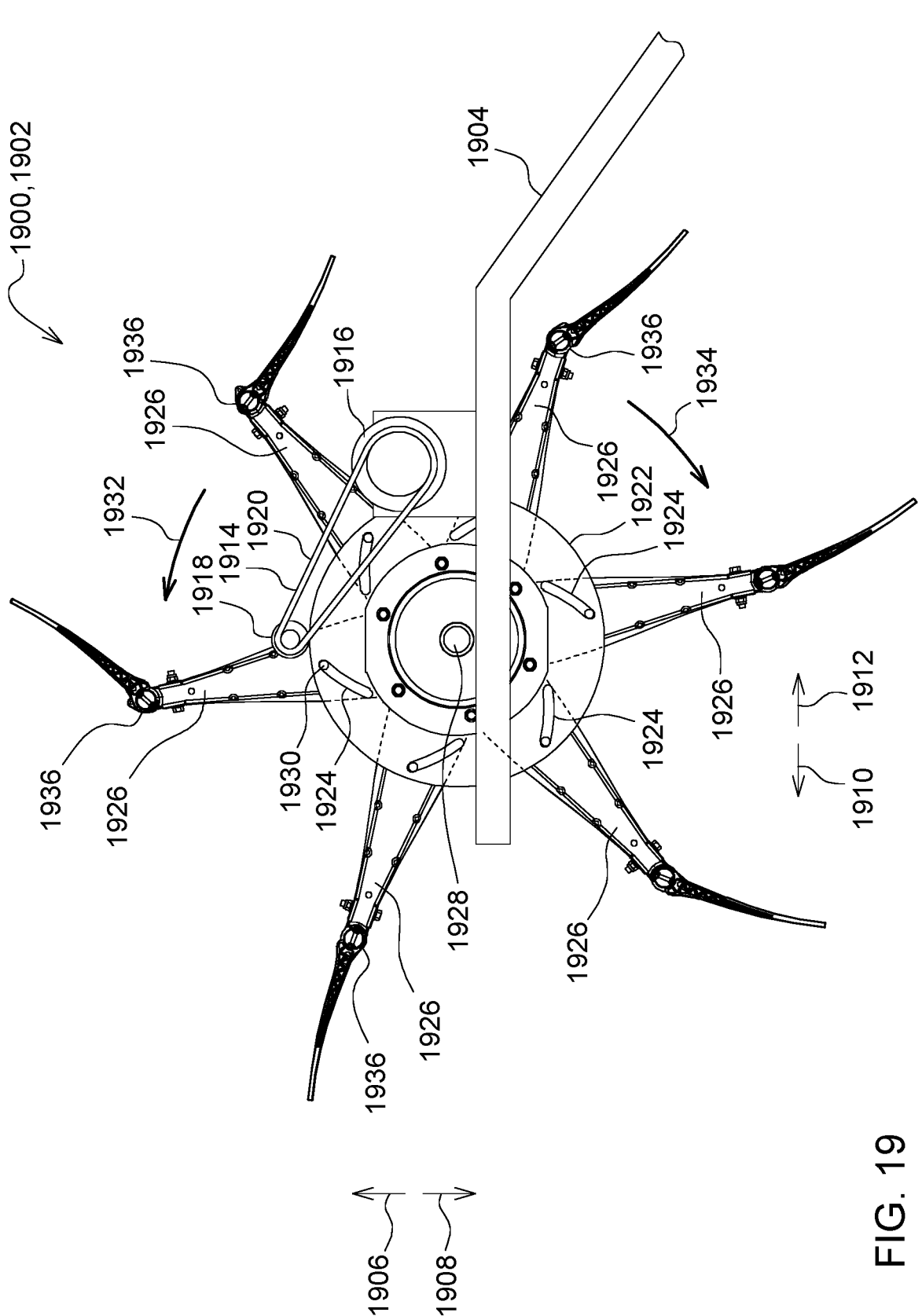
FIG. 19 is a diagrammatic side view of another example reel section in which a shape of bat tubes arranged about a circumference of the reel section at one more locations is alterable in a common way, according to some implementations of the present disclosure.

Additional example configurations of a reel having the ability to alter a shape of one or more bat tubes is described below in the context of FIGS. 19 and 20. The shape of the bat tubes is altered by altering a position of the bat tubes at one or more locations along the lengths thereof. FIG. 19 is a side diagrammatic view of another example reel section 1900 of an example reel 1902. The reel section 1900 is mounted on a reel arm 1904 that may be similar to reel arm 154. The reel arm 1904 is positioned at an inboard end of the reel section 1900 and is used to increase or decrease an elevation of the reel section 1900 in the direction of arrows 1906 and 1908, respectively. Additionally, in some implementations, the reel section 1900 is movable outwardly along the reel arm 1904 in the direction of arrow 1910 and inwardly along the reel arm 1904 in the direction of arrow 1912.

A drive system 1914 is included on the reel section 1900. The drive system 1914 includes a first pulley 1916 and a second pulley 1918 operably connected with, for example, a chain or belt 1920. In some implementation, the first and second pulleys 1916 and 1918 may be connected via a system of gears. The first pulley 1916 drives the second pulley 1918 engaged with a wheel 1922 rotatably mounted on the reel section 1900. The wheel 1922 includes a plurality of arc-shaped slots 1924. A plurality of bat tube supports 1926 at a location along a center shaft 1928 are distributed about a circumference of the center shaft 1928 of the reel section 1900. In the illustrated example, the bat tube supports 1926 may be similar to the bat tube support 710 and slidably mounted to the center shaft 1928 as explained above. A protrusion 1930 associated with each bat tube support 1926 is received into a corresponding one of the arc-shaped slots 1924.

The first pulley 1916 is driven, for example, by a motor (e.g., an electric motor or hydraulic motor) or via another drive components, such as another belt. Operation of the drive system to cause the wheel to rotate in the direction of arrow 1932 relative to the bat tube supports 1916 causes the bat tube supports 1926 to move outwardly due to interaction between the associated protrusions 1930 and arc-shaped slots 1924. Operation of the drive system 1914 to rotate the wheel in the direction of arrow 1934 relative to the bat tube supports 1926 causes the bat tube supports 1926 to move inwardly towards the center shaft 1928 in response to interaction between the protrusions 1930 and the arc-shaped slots 1924.

Figure 20:
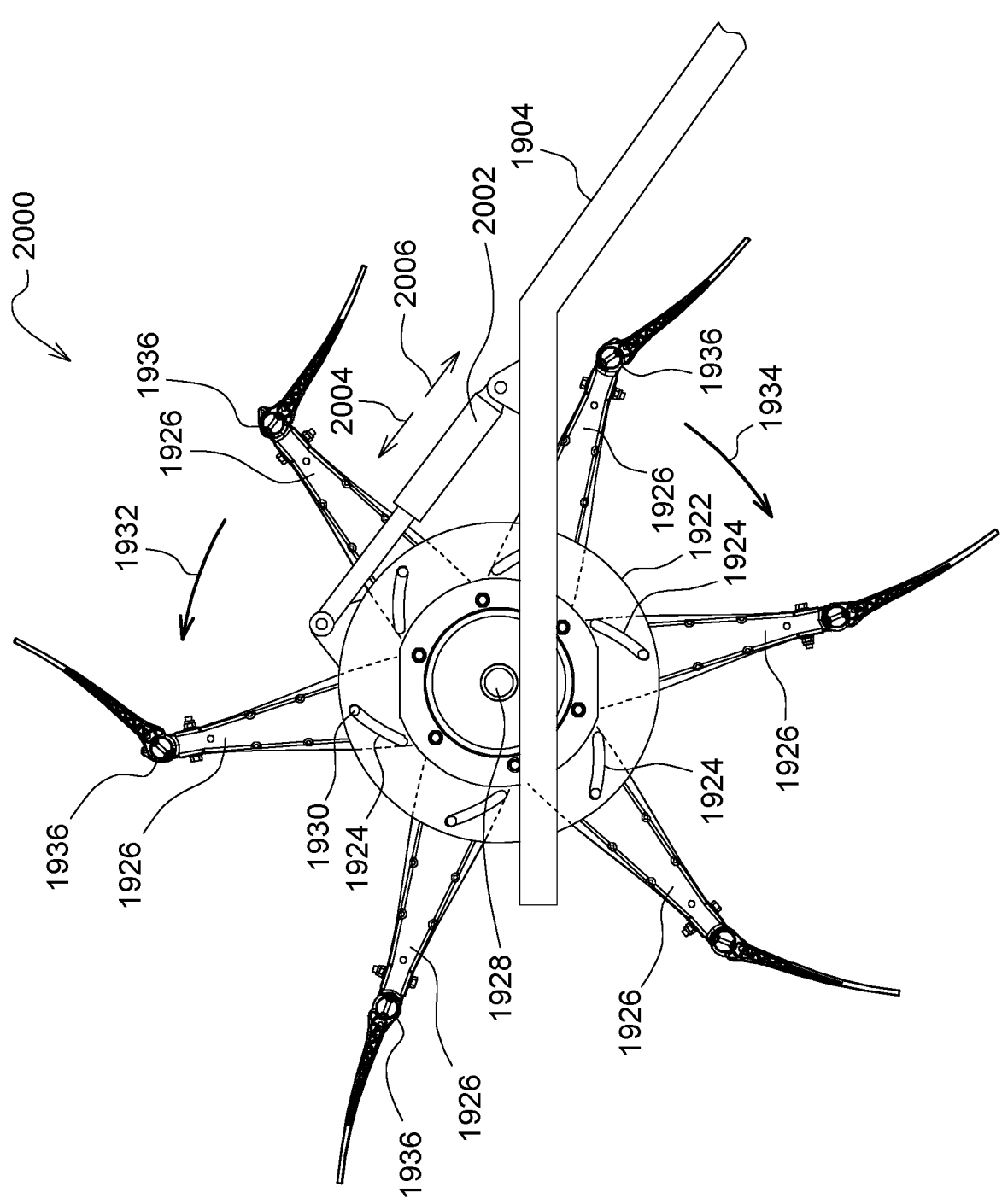
FIG. 20 is a diagrammatic view of another example reel section in which a shape of bat tubes arranged about a circumference of the reel section at one more locations is alterable in a common way, according to some implementations of the present disclosure.

FIG. 20 is a diagrammatic side view of another example reel section 2000 mounted on reel arm 1904. In this example, a linear actuator 2002 is used to alter a position of the wheel 1922 to alter a position of the bat tube supports 1926 relative to the center shaft 1928. Example linear actuators 2002 include hydraulic linear actuators, electrical linear actuators, and pneumatic linear actuators. Other types of actuators may also be used. Extension of the linear actuator 2002 in the direction of arrow 2004 rotates the wheel 1922 in the direction of arrow 1932 relative to the bat tube supports 1926, causing the bat tube supports 1926 to be displaced outwardly away from the center shaft 1928. Alternately, retraction of the linear actuator 2002 in the direction of arrow 2006 causes the wheel 1922 to rotate relative to the bat tube supports 1926 in the direction of arrow 1934, causing the bat tube supports 1926 to be displaced inwardly towards the center shaft 1928.

By altering a position of the bat tube supports 1926 using the wheel 1922, as described in the example of FIGS. 19 and 20, the bat tubes 1936 associated with each of the bat tube supports 1926 is corresponding moved in the same direction as the bat tube supports 1926. Thus, in these examples, at the inboard location shown, all of the bat tubes 1936 move collectively in the same direction, either inwardly or outwardly, in response to rotation of the wheel 1922 relative to the bat tube supports 1926.

The example reel sections 1900 and 2000 of FIGS. 19 and 20 utilize a position sensor, e.g., a sensor that measures a tilt of the reel section or a part of a header connected to the reel section. For example, in some implementations, a header may include a wing position sensor, such as wing position sensor 224 shown in FIGS. 2, 3, and 4, that measures an angle formed between a wing, such as wing 206 or 208, described earlier, and a center section, such as center section 204, described above. Although a single wing position sensor 224 is provided for the wing 206, another wing position sensor may be included to sense a position of the wing 208 relative to the center section 204. The sensor measurements provided by the wing position sensor can be used as a proxy of the movement of the reel section connected to the wing. Thus, in some implementations, the output of the wing position sensor is used as a representation of movement of the associated reel section to control adjustment of a position of one or more bat tubes of the reel section at one or more locations along the length of the reel section. In other implementations, a sensor that senses movement of the reel section relative to another part of a header may be used to detect an amount of movement, direction of movement, or both.

Figure 21:
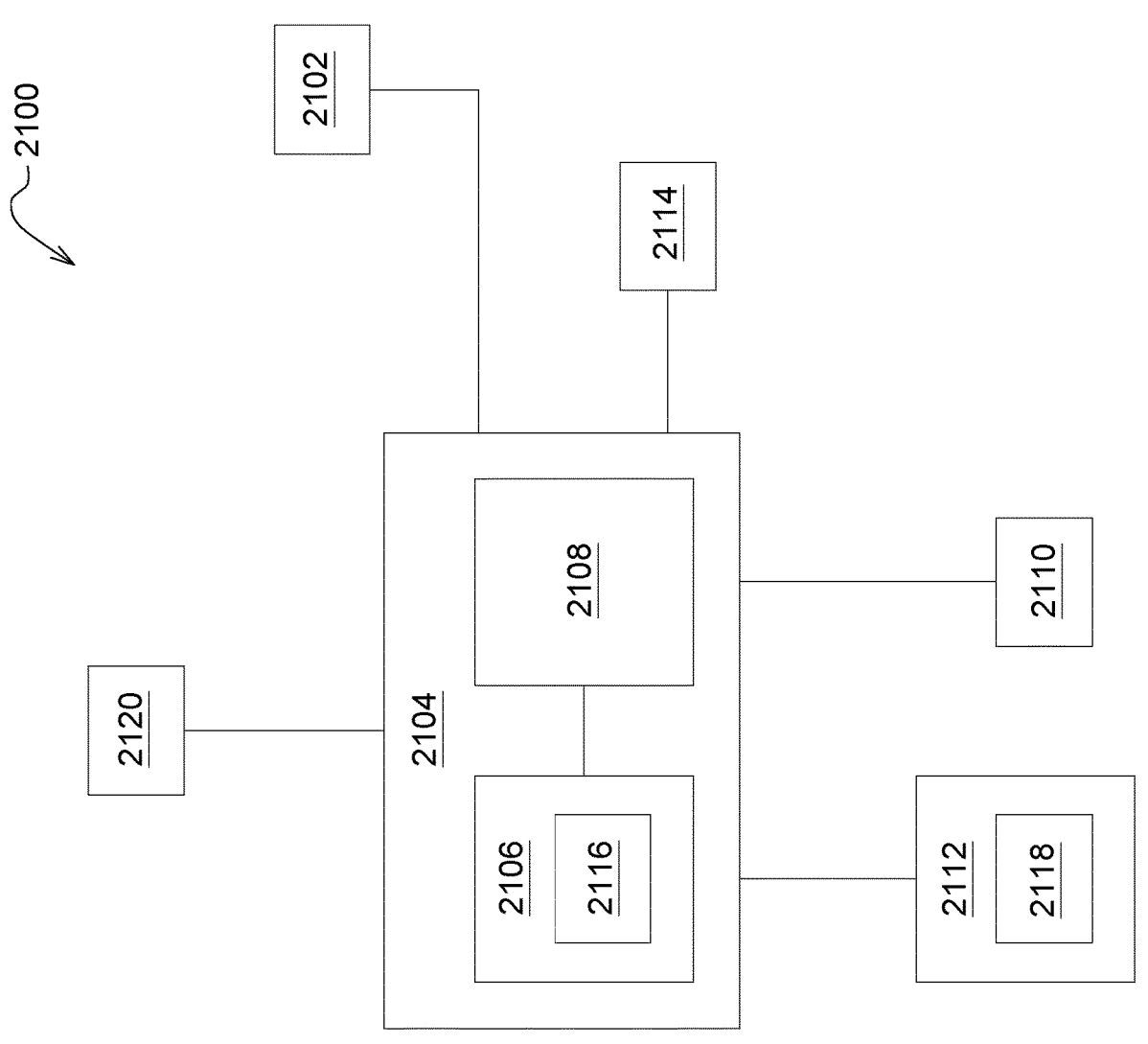
FIG. 21 is a schematic view of an example control system, according to some implementations of the present disclosure.

FIG. 21 is an example control system 2100 that includes a position sensor 2102, similar to the wing position sensor 224, configured to detect a position of a reel section or an object whose position is indicative of the reel section, such as detecting a position of a wing attached to the reel section relative to a center section of a header frame. The position sensor 2102 detects whether the reel section moves into a bump condition or a droop condition and a degree of such movement (e.g., an angular amount of the movement). The position sensor 2102 generates a signal corresponding to the position of the reel section and transmits the signal to an electronic controller 2104 either via wired or wireless connection. The controller 2104 includes a processor 2106 communicably coupled to a memory 2108. The control system 2100 also includes an input device 2110, a display 2112, and a database 2114. The illustrated control system 2100 is provided merely as an example. One or more components or features of the example control system 2100 may be omitted or one or more components or features may be added and still remain within the scope of the present disclosure. For example, in some instances, the input device 2110 or database 2114 may be omitted In some implementations, the controller 2104 is a computer system, such as computer system 2300 described in more detail below. Additional details of the controller 2104, such as processor 2106 and memory 2108, are described below in the context of computer system 2300. The memory 2108 communicates with the processor 2106 and is used to store programs and other software, information, and data. The processor 2106 is operable to execute programs and software, such as software 2116, and receive information from and send information to the memory 2108. Although a single memory 2108 and a single processor 2106 are illustrated, in other implementations, a plurality of memories, processors, or both may be used. Although the processor 2106 and the memory 2108 are shown as being local components of the controller 2104, in other implementations, one or both of the processor 2106 and memory 2108 may be located remotely. The software 2116, such as in the form of an application or program, is executed by the processor 2106 to control operation of the control system 2100, as described in more detail below.

The input device 2110 is communicably coupled via a wired or wireless connection. Example input devices 2110 include a keyboard, keypad, one or more buttons, a slider bar, a dial, a knob, a mouse, or a joystick. The display 2112 is communicably coupled to the controller 2104 via a wired or wireless connection. The display 2112 displays information, such as information related to the operation of control system 2100. For example, information displayed by the display 2112 may include a condition of the reel section (e.g., whether the reel section is in a bump condition or a droop condition and a magnitude of the condition). In some instances, the information displayed by the display 2112 is displayed via a graphical user interface (GUI) 2118. Example displays include cathode ray tubes (CRT), liquid crystal displays (LCDs), or plasma displays. Other types of displays are also within the scope of the present disclosure. In some implementations, the display 2112 is a touch screen that is operable to receive input from a user via a user's touch. In some implementations in which the display 2112 is a touch screen, the input device 2110 is omitted.

The controller 2104 receives the signals from the position sensor 2102 and, using the software 2116, determines a condition of the reel section, such as whether the reel section is a neutral position, a bump condition, or a droop condition. If the reel section is in a bump condition or a droop condition, the controller 2104 utilizes the signals to determine a magnitude of the bump condition or the droop condition. Based on these determinations, the controller 2104 transmits control signals to an actuator 2120, such as a linear actuator similar to linear actuator 2002 or drive system similar to drive system 1914, to alter a position of one or more bat tubes of the reel section at one or more locations therealong. For example, the signals control the actuator to rotate a wheel similar to wheel 1922 to move one or more bat tube supports inwardly or outwardly to alter a position of one or more of the bat tubes.

Figure 22:
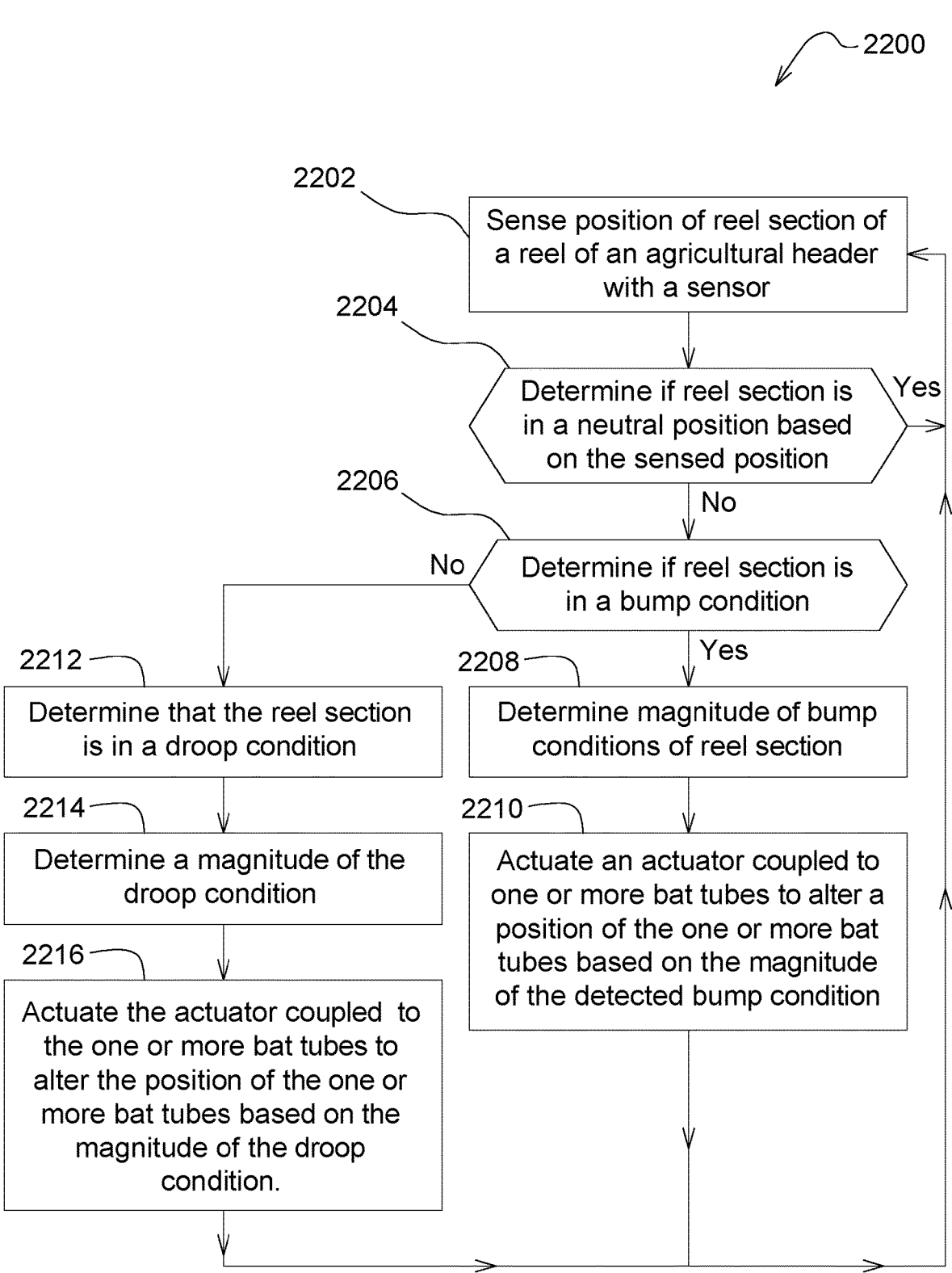
FIG. 22 is a flowchart of an example method of altering a shape of one or more bat tubes at one or more locations along a length of the bat tubes, according to some implementations of the present disclosure.

FIG. 22 is a flowchart of an example method 2200 of controlling a position of one more bat tubes of a reel section, such as the reel section 1900 or 2000, based on a detected position of the reel section and a magnitude of the detected position. The example method 2200 describes an example algorithm that may be included with or form the software 2116 described above. However, the method 2200 represents merely one example method within the scope of the present disclosure.

At 2202, a position of the reel section is detected with a sensor. In some implementations, a wing position sensor of a wing to which the reel section is coupled is used, and the position of the wing relative to a center section of a header is used as a proxy for the position of the reel section. At 2204, a determination is made as to whether the reel section is in a neutral position. In the neutral position, the reel section is neither in a bump condition nor a droop condition. If the reel section is determined to be in the neutral position, the method 2200 returns to 2202. If the reel section is determined not to be in the neutral position, the method 2200 moves to 2206 where a determination is made as to whether the reel section is in a bump condition. If the reel section is determined to be in the bump condition, at 2208, a magnitude of the bump condition is determined using the sensed position. At 2210, an actuator coupled to one or more bat tubes of the reel section is actuated to alter a position of the one or more bat tubes based on the magnitude of the detected bump condition. If the header containing the reel section is continuing to be operated, such as during a harvesting operation in a field, and continued sensing of a position of the reel section is desired, the method 2200 then returns to 2202. If continued use of the header is not desired, then the method 2200 ends.

If the reel section is not determined to be in a bump condition, then the method 2200 moves from 2206 to 2212. At 2212, the reel section is determined to be in a droop condition since determinations that the reel section is in neither a neutral position or a bump condition have already been made at 2204 and 2206. At 2214, a magnitude of the droop condition of the reel is made. At 2216, the actuator coupled to the one or more bat tubes of the reel section is actuated to alter the position of the one or more bat tubes based on the magnitude of the droop condition. If the header containing the reel section is continuing to be operated, the method 2200 returns to 2202. If continued use of the header is not desired, the method 2200 ends.

Figure 23:
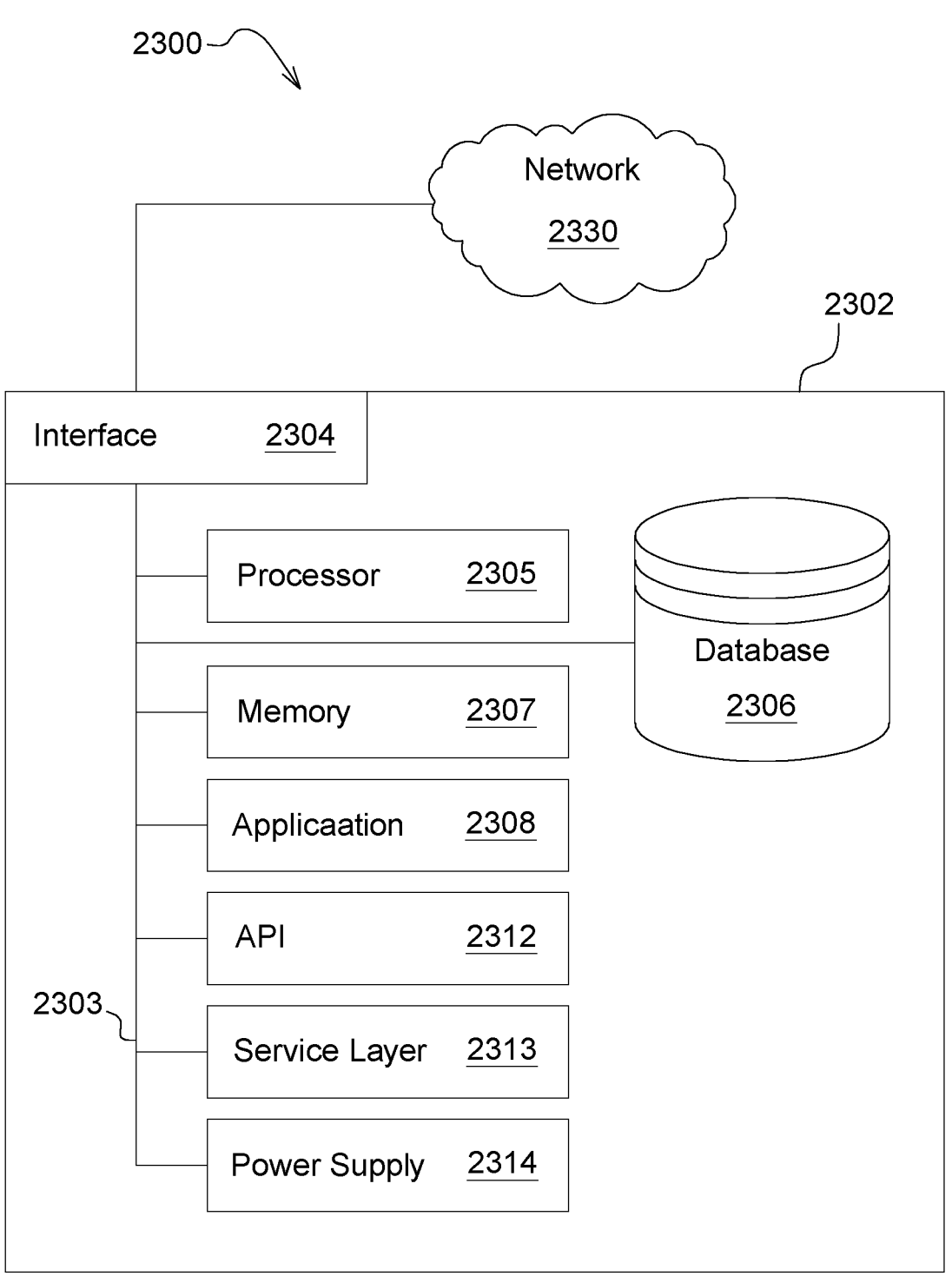
FIG. 23 is a block diagram illustrating an example computer system used to provide computational functionalities associated with described algorithms, methods, functions, processes, flows, and procedures as described in the present disclosure, according to some implementations of the present disclosure.

FIG. 23 is a block diagram of an example computer system 2300 used to provide computational functionalities associated with described algorithms, methods, functions, processes, flows, and procedures described in the present disclosure, according to some implementations of the present disclosure. The illustrated computer 2302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2302 can include input devices such as keypads, keyboards, and touch screens that can accept user information. Also, the computer 2302 can include output devices that can convey information associated with the operation of the computer 2302. The information can include digital data, visual data, audio information, or a combination of information. The information can be presented in a graphical user interface (UI) (or GUI).

The computer 2302 can serve in a role as a client, a network component, a server, a database, a persistency, or components of a computer system for performing the subject matter described in the present disclosure. The illustrated computer 2302 is communicably coupled with a network 2330. In some implementations, one or more components of the computer 2302 can be configured to operate within different environments, including cloud-computing-based environments, local environments, global environments, and combinations of environments.

At a high level, the computer 2302 is an electronic computing device operable to receive, transmit, process, store, and manage data and information associated with the described subject matter. According to some implementations, the computer 2302 can also include, or be communicably coupled with, an application server, an email server, a web server, a caching server, a streaming data server, or a combination of servers.

The computer 2302 can receive requests over network 2330 from a client application (for example, executing on another computer 2302). The computer 2302 can respond to the received requests by processing the received requests using software applications. Requests can also be sent to the computer 2302 from internal users (for example, from a command console), external (or third) parties, automated applications, entities, individuals, systems, and computers.

Each of the components of the computer 2302 can communicate using a system bus 2303. In some implementations, any or all of the components of the computer 2302, including hardware or software components, can interface with each other or the interface 2304 (or a combination of both), over the system bus 2303. Interfaces can use an application programming interface (API) 2312, a service layer 2313, or a combination of the API 2312 and service layer 2313. The API 2312 can include specifications for routines, data structures, and object classes. The API 2312 can be either computer-language independent or dependent. The API 2312 can refer to a complete interface, a single function, or a set of APIs.

The service layer 2313 can provide software services to the computer 2302 and other components (whether illustrated or not) that are communicably coupled to the computer 2302. The functionality of the computer 2302 can be accessible for all service consumers using this service layer. Software services, such as those provided by the service layer 2313, can provide reusable, defined functionalities through a defined interface. For example, the interface can be software written in JAVA, C++, or a language providing data in extensible markup language (XML) format. While illustrated as an integrated component of the computer 2302, in alternative implementations, the API 2312 or the service layer 2313 can be stand-alone components in relation to other components of the computer 2302 and other components communicably coupled to the computer 2302. Moreover, any or all parts of the API 2312 or the service layer 2313 can be implemented as child or sub-modules of another software module, enterprise application, or hardware module without departing from the scope of the present disclosure.

The computer 2302 includes an interface 2304. Although illustrated as a single interface 2304 in FIG. 23, two or more interfaces 2304 can be used according to particular needs, desires, or particular implementations of the computer 2302 and the described functionality. The interface 2304 can be used by the computer 2302 for communicating with other systems that are connected to the network 2330 (whether illustrated or not) in a distributed environment. Generally, the interface 2304 can include, or be implemented using, logic encoded in software or hardware (or a combination of software and hardware) operable to communicate with the network 2330. More specifically, the interface 2304 can include software supporting one or more communication protocols associated with communications. As such, the network 2330 or the interface's hardware can be operable to communicate physical signals within and outside of the illustrated computer 2302.

The computer 2302 includes a processor 2305. Although illustrated as a single processor 2305 in FIG. 23, two or more processors 2305 can be used according to particular needs, desires, or particular implementations of the computer 2302 and the described functionality. Generally, the processor 2305 can execute instructions and can manipulate data to perform the operations of the computer 2302, including operations using algorithms, methods, functions, processes, flows, and procedures as described in the present disclosure.

The computer 2302 also includes a database 2306 that can hold data for the computer 2302 and other components connected to the network 2330 (whether illustrated or not). For example, database 2306 can be an in-memory, conventional, or a database storing data consistent with the present disclosure. In some implementations, database 2306 can be a combination of two or more different database types (for example, hybrid in-memory and conventional databases) according to particular needs, desires, or particular implementations of the computer 2302 and the described functionality. Although illustrated as a single database 2306 in FIG. 23, two or more databases (of the same, different, or combination of types) can be used according to particular needs, desires, or particular implementations of the computer 2302 and the described functionality. While database 2306 is illustrated as an internal component of the computer 2302, in alternative implementations, database 2306 can be external to the computer 2302.

The computer 2302 also includes a memory 2307 that can hold data for the computer 2302 or a combination of components connected to the network 2330 (whether illustrated or not). Memory 2307 can store any data consistent with the present disclosure. In some implementations, memory 2307 can be a combination of two or more different types of memory (for example, a combination of semiconductor and magnetic storage) according to particular needs, desires, or particular implementations of the computer 2302 and the described functionality. Although illustrated as a single memory 2307 in FIG. 23, two or more memories 2307 (of the same, different, or combination of types) can be used according to particular needs, desires, or particular implementations of the computer 2302 and the described functionality. While memory 2307 is illustrated as an internal component of the computer 2302, in alternative implementations, memory 2307 can be external to the computer 2302.

The application 2308 can be an algorithmic software engine providing functionality according to particular needs, desires, or particular implementations of the computer 2302 and the described functionality. For example, application 2308 can serve as one or more components, modules, or applications. Further, although illustrated as a single application 2308, the application 2308 can be implemented as multiple applications 2308 on the computer 2302. In addition, although illustrated as internal to the computer 2302, in alternative implementations, the application 2308 can be external to the computer 2302.

The computer 2302 can also include a power supply 2314. The power supply 2314 can include a rechargeable or non-rechargeable battery that can be configured to be either user- or non-user-replaceable. In some implementations, the power supply 2314 can include power-conversion and management circuits, including recharging, standby, and power management functionalities. In some implementations, the power-supply 2314 can include a power plug to allow the computer 2302 to be plugged into a wall socket or a power source to, for example, power the computer 2302 or recharge a rechargeable battery.

There can be any number of computers 2302 associated with, or external to, a computer system containing computer 2302, with each computer 2302 communicating over network 2330. Further, the terms "client," "user," and other appropriate terminology can be used interchangeably, as appropriate, without departing from the scope of the present disclosure. Moreover, the present disclosure contemplates that many users can use one computer 2302 and one user can use multiple computers 2302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Without in any way limiting the scope, interpretation, or application of the claims appearing below, a technical effect of one or more of the example implementations disclosed herein is ability to alter a position of at least one bat tube of a reel (e.g., a reel section) at at least one location along a length of the reel in order to provide better engagement between standing crop and the reel, reduce a risk of contact between the reel and another part of the header, or both. Another technical effect of one or more of the example implementations disclosed herein is the ability, in some implementations, to alter a shape of a bat tube of a reel passively.

Example agricultural headers within the scope of the present disclosure may include a bat tube support that includes a first bat tube support portion attached to a central shaft and a second bat tube support portion slideably coupled to the first bat tube support portion. The second bat tube support portion may be movable relative to the first bat tube support portion in response to actuation of a linkage. Example agricultural headers within the scope of the present disclosure may include a first bat tube support portion and a second bat tube support portion that are slideably connected to each other. Example agricultural headers within the scope of the present disclosure may include movement of a second bat tube support portion relative to a first bat tube support portion that includes movement in a direction perpendicular to an axis defined by a central shaft of a reel section. Example agricultural headers within the scope of the present disclosure may include displacing a bat tube relative to a central shaft of a reel section of a reel in response to displacement of a link, and displacing the bat tube relative to a central shaft in response to displacement of the link may include displacing a first portion of the bat tube support relative to a second portion of the bat tube support.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An agricultural header comprising
a frame comprising:
   a center section;
   a wing pivotably mounted to the center section, the wing pivotable in response to changing topography of a surface as the agricultural header is moved across the surface;
a reel rotatably mounted to the frame, the reel comprising:
   a first reel section coupled to the wing such that the first reel section pivots in response to pivoting of the wing, the first reel section comprising:

a central shaft defining a first axis, the first reel section rotatable about the first axis;
   a first bat tube support extending from the central shaft; and
   a bat tube coupled to a distal end of the first bat tube support;
an inboard mount offset from and adjacent to an end of central shaft; and
a linkage that is actuatable in response to pivoting of the first reel section and configured to alter a position of the bat tube relative to the central shaft at at least one location along a length of the bat tube, the linkage including a first link coupled to the inboard mount.

2. The agricultural header of claim 1, wherein the first link includes:
   a first end pivotably coupled to the inboard mount; and
   a second end, opposite the first end; and
wherein the linkage further includes:
   a first bell crank comprising:
      a first end portion, a second end of the first link pivotably attached to the first end portion of the first bell crank; and
      a second end portion attached to the first end portion, the second end portion coupled to the bat tube,
   wherein the linkage is actuatable in response to pivoting of the first reel section of the reel to move the first link and, in response, pivot the first bell crank to displace the bat tube relative to the central shaft.

3. The agricultural header of claim 2, wherein the first reel section comprises a second bat tube support laterally offset from the first bat tube support along the first axis, wherein the linkage further comprises:
   a second bell crank disposed adjacent to the first bat tube support, wherein the first bell crank is disposed adjacent to the second bat tube support; and
   a second link extending between the first bell crank and the second bell crank, and
   wherein the second link transmits movement of the first bell crank to the second bell crank.

4. The agricultural header of claim 3, wherein the second bell crank comprises:
   a first end portion; and
   a second end portion coupled to the first end portion,
   wherein the second end portion of the first bell crank engages the second bat tube support,
   wherein the first end portion of the second bell crank is connected to the second link,
   wherein the second end portion of the second bell crank engages the first bat tube support, and
   wherein actuation of the linkage pivots the first bell crank and the second bell crank to one of extend and retract the first bat tube support and the second bat tube support to displace the bat tube relative to the central shaft.

5. The agricultural header of claim 2, wherein the first end portion engages a portion of the first bat tube support, and wherein actuation of the first bell crank causes the first end portion to displace the portion of the first bat tube support relative to the central shaft.

6. The agricultural header of claim 1, wherein at least a portion the first bat tube support is configured to be displaced relative to the central shaft in response to actuation of the linkage.

7. The agricultural header of claim 1, wherein the distal end of the first bat tube support defines a second axis and wherein the bat tube is configured to be rotated about the second axis to alter a distance between the bat tube and the central shaft.

8. The agricultural header of claim 7, wherein the second axis extends parallel to the first axis.

9. The agricultural header of claim 7, wherein the first reel section further comprises a bracket extending between the distal end of the bat tube support and the bat tube, and wherein the bat tube is configured to be rotated about the second axis by rotation of the bracket about the second axis.

10. The agricultural header of claim 9, wherein the linkage comprises a second link connected to the bracket.

11. The agricultural header of claim 10, wherein the second link is attached to the bracket between the distal end of the bat tube support and the bat tube.

12. An agricultural header comprising:

a frame comprising:

a center section;

a wing pivotably mounted to the center section, the wing pivotable in response to changing topography of a surface as the agricultural header is moved across the surface;

a reel rotatably mounted to the frame, the reel comprising:

a first reel section coupled to the wing such that the first reel section pivots in response to pivoting of the wing, the first reel section comprising:

a central shaft defining a first axis, the first reel section rotatable about the first axis;

a first bat tube support extending from the central shaft; and a bat tube coupled to a distal end of the first bat tube support;

a linkage that is actuatable in response to pivoting of the first reel section and configured to alter a position of the bat tube relative to the central shaft at at least one location along a length of the bat tube, wherein at least a portion the first bat tube support is configured to be displaced relative to the central shaft in response to actuation of the linkage, and wherein the central shaft comprises a flange, wherein the first bat tube support is slideably coupled to the flange, and wherein displacement of the first bat tube support relative to the central shaft in response to actuation of the linkage comprises a sliding of the first bat tube support relative to the flange to displace the first bat tube support relative to the central shaft.

13. The agricultural header of claim 12, wherein the first bat tube support comprises one of a protrusion and a slot, wherein the flange comprises the other of the protrusion and the slot, and wherein the protrusion is received into and slideable within the slot.

14. A method of altering a position of a bat tube of a reel of an agricultural implement relative to a central shaft of the reel, the method comprising:

pivoting a first header portion of an agricultural header relative to a second header portion, the agricultural header comprising:

the first header portion;

the second header portion pivotably connected relative to the first header portion;

a reel comprising a first reel section connected to the second header portion such that pivoting of the second header portion relative to the first header portion causes pivoting of the first reel section, the first reel section comprising:

a central shaft defining a first axis, the first reel section rotatable about the first axis;

a bat tube support arm extending from the central shaft; and a bat tube coupled to a distal end of the bat tube support; and a linkage comprising a link that extends along at least a portion of a length of the central shaft and is coupled to the bat tube;

displacing the link of the linkage in response to pivoting of the first header portion; and displacing the bat tube relative to the central shaft in response to displacement of the link.

15. The method of claim 14, wherein displacing the link of the linkage in response to pivoting of the first header portion comprises pivoting a bell crank of the linkage.

16. The method of claim 15, wherein pivoting of the bell crank comprises displacing at least a portion of the bat tube support relative to the central shaft.

17. The method of claim 14, wherein displacing the bat tube relative to the central shaft in response to displacement of the link comprises pivoting the bat tube about an axis defined at a distal end of the bat tube support.

* * * * *